United States Patent
Nakagawa et al.

(10) Patent No.: US 9,612,837 B2
(45) Date of Patent: Apr. 4, 2017

(54) TRACE METHOD AND INFORMATION PROCESSING APPARATUS

(71) Applicant: FUJITSU LIMITED, Kawasaki-shi, Kanagawa (JP)

(72) Inventors: Takashi Nakagawa, Kawasaki (JP); Yasutoshi Suzuki, Inagi (JP); Hiroyuki Yamamoto, Kawasaki (JP); Kazuhide Imaeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 439 days.

(21) Appl. No.: 14/483,750

(22) Filed: Sep. 11, 2014

(65) Prior Publication Data

US 2015/0095626 A1   Apr. 2, 2015

(30) Foreign Application Priority Data

Sep. 30, 2013   (JP) ................................. 2013-203365

(51) Int. Cl.
*G06F 9/30* (2006.01)
*G06F 11/36* (2006.01)
*G06F 11/30* (2006.01)

(52) U.S. Cl.
CPC .......... *G06F 9/30145* (2013.01); *G06F 11/30* (2013.01); *G06F 11/36* (2013.01); *G06F 11/3624* (2013.01)

(58) Field of Classification Search
None
See application file for complete search history.

(56) References Cited

U.S. PATENT DOCUMENTS

| 6,182,244 B1 * | 1/2001 | Bankemper ......... G06F 11/3636 712/227 |
| 6,715,140 B1 * | 3/2004 | Haga ................... G06F 11/3636 712/227 |
| 2010/0251220 A1 | 9/2010 | Jeong |

FOREIGN PATENT DOCUMENTS

| JP | 2006-268298 | 10/2006 |
| JP | 2010-238228 | 10/2010 |

* cited by examiner

*Primary Examiner* — William B Partridge
(74) *Attorney, Agent, or Firm* — Fujitsu Patent Center

(57) ABSTRACT

An information processing apparatus includes a rewriting unit and an execution unit. The rewriting unit rewrites a first instruction described at a trace point in a function defined in a program to a second instruction which gives instructions to execute a trace code, and stores the first instruction in a storage unit. The execution unit executes the trace code on the basis of the second instruction at the time of execution at the trace point in the function. If a third instruction which calls the function is included in the trace code, the execution unit replaces, at the time of executing the third instruction, the second instruction at the trace point in the function with the first instruction stored in the storage unit, and performs the function.

7 Claims, 28 Drawing Sheets

FIG. 7
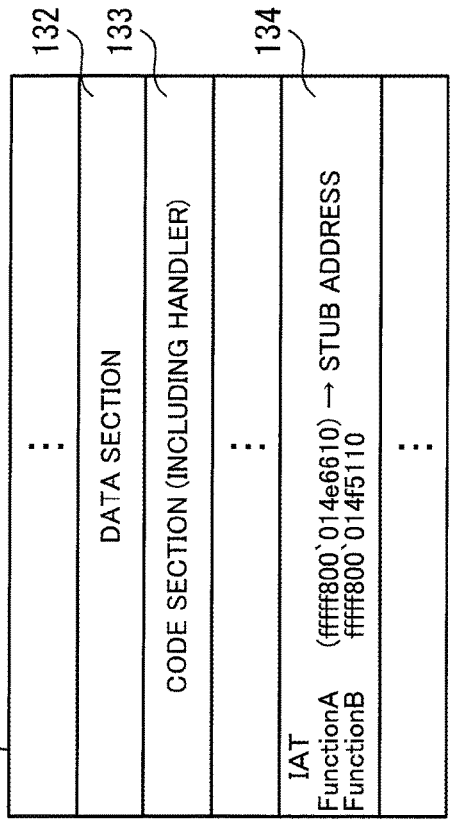
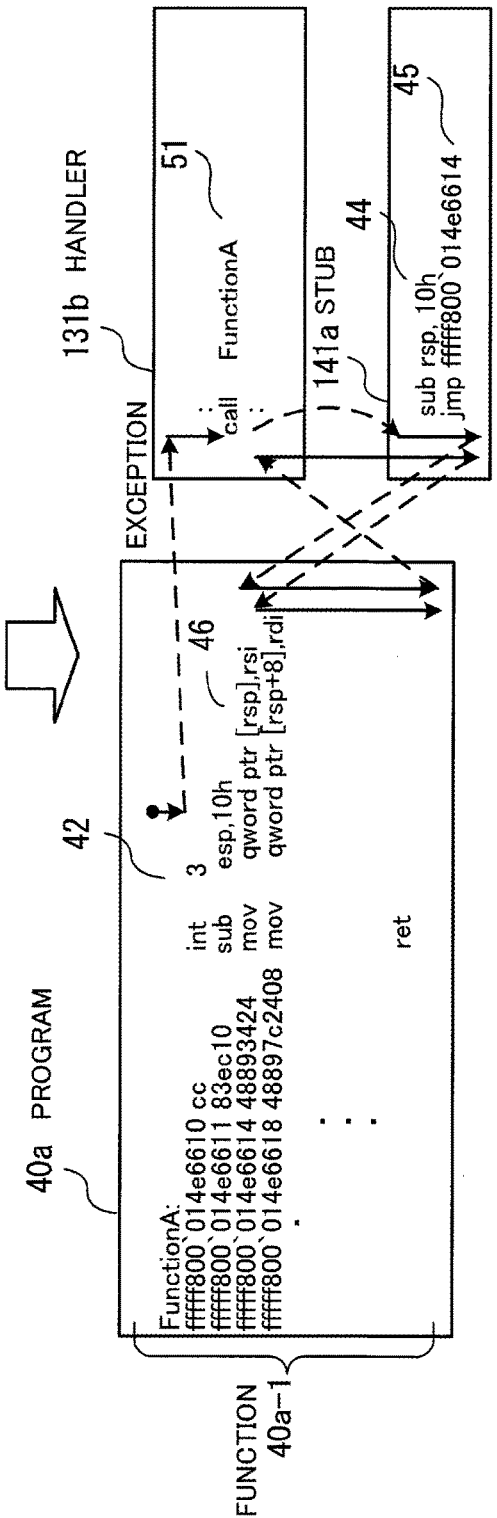

32 TRACE SETTING FILE

```
// DESIGNATE DATA BUFFER SIZE
 [SETTING]
 DataSize  = XXXX MB

// TRACE POINT
 [TRACEPOINT]
    FunctionA                    // DESIGNATE BY SYMBOL NAME
        .
        .
        .
        .
    0xfffff80001234567           // DESIGNATE BY ADDRESS
```

FIG. 8

60 TRACE MANAGEMENT TABLE

| TRACE ADDRESS | ORIGINAL INSTRUCTION | STUB ADDRESS |
|---|---|---|
| 0xAAAAAAAA | aaaa | stubA |
| 0xBBBBBBBB | bbbb | stubB |
| 0xCCCCCCCC | cccc | stubC |
| ... | ... | ... |
| ... | ... | ... |
| ... | ... | ... |
| 0xMMMMMMM | mmmm | stubM |

FIG. 10

32a TRACE SETTING FILE

```
// DESIGNATE DATA BUFFER SIZE
[SETTING]
DataSize  = XXXX MB

// TRACE POINT
[TRACEPOINT]
   FunctionA              // DESIGNATE BY SYMBOL NAME
   FunctionC+0x5          // DESIGNATE BY SYMBOL NAME AND OFFSET
      .
      .
      .
      .
   0xffffff80001234567    // DESIGNATE BY ADDRESS
```

FIG. 19

63 TID MANAGEMENT TABLE

| TRACE ADDRESS | TID |
|---|---|
| 0xAAAAAAAA | aaa1, aaa2, aaa3··· |
| 0xBBBBBBBB | bbb1, bbb2, bbb3··· |
| 0xCCCCCCCC | ccc1, ccc2, ccc3··· |
| 0xDDDDDDDD | ddd1, ddd2, ddd3··· |
| ··· | ··· |
| ··· | ··· |

FIG. 22

TRACE METHOD AND INFORMATION PROCESSING APPARATUS

CROSS-REFERENCE TO RELATED APPLICATION

This application is based upon and claims the benefit of priority of the prior Japanese Patent Application No. 2013-203365, filed on Sep. 30, 2013, the entire contents of which are incorporated herein by reference.

FIELD

The embodiments discussed herein are related to a trace method and an information processing apparatus.

BACKGROUND

In recent years the functions of OSes (Operating Systems) have been enhanced and expanded. As a result, the scale of OSes has increased and failures which occur in OSes have become more complex. A trace technique is known as one of techniques for examining an OS failure. With the trace technique information regarding the state of a computer at a point of time at which a specific code in a program is executed is collected. With the trace technique information, such as the contents of a register, at the time when a specific code is executed is collected. The trace technique is used especially for examining a complex failure the cause of which is difficult to clear up. In order to examine failures in OSes which will develop further in the future and which will become more complex, it is important to improve the trace technique.

For example, a debugging method which makes it possible to perform, even in the case of an exception occurring at the same point in a program, different exception handling in each process is proposed as a technique which is useful for examining a failure.

Japanese Laid-open Patent Publication No. 2006-268298

If a trace process is performed by calling a program, such as an API (Application Program Interface), prepared by an OS, then the flexibility of the trace process increases. For example, if an API for manipulating a file in a storage unit can be called during a trace process, then information collected in the trace process can be saved in the storage unit. A failure may occur in a program, such as an API, prepared by an OS. In that case, a trace process will be performed with the program, such as an API, as a trace object.

However, the conventional trace techniques have the following problem. If a program, such as an API, called during a trace process is treated as a trace object, then the program is recursively called in the trace process and the trace process enters an endless loop. As a result, it is impossible to treat a program called during a trace process as a trace object.

SUMMARY

According to an aspect, there is provided a computer-readable, non-transitory storage medium storing a processing program that causes a computer to perform a trace process on the basis of a trace code during execution of a program. The trace process includes: rewriting a first instruction described at a trace point in a function defined in the program to a second instruction which gives instructions to execute the trace code and storing the first instruction in a storage unit; executing the trace code on the basis of the second instruction at the time of execution at the trace point in the function; and replacing, at the time of executing a third instruction which calls the function and which is included in the trace code, the second instruction at the trace point in the function with the first instruction stored in the storage unit and performing the function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 indicates an example of calling a program, which is a trace object, in a handler in the second embodiment;

FIG. 8 indicates an example of a trace setting file;

FIG. 10 indicates an example of a trace management table;

FIG. 19 indicates an example of a trace setting file in the third embodiment;

FIG. 22 indicates an example of a TID management table;

DESCRIPTION OF EMBODIMENTS

Figure 1:
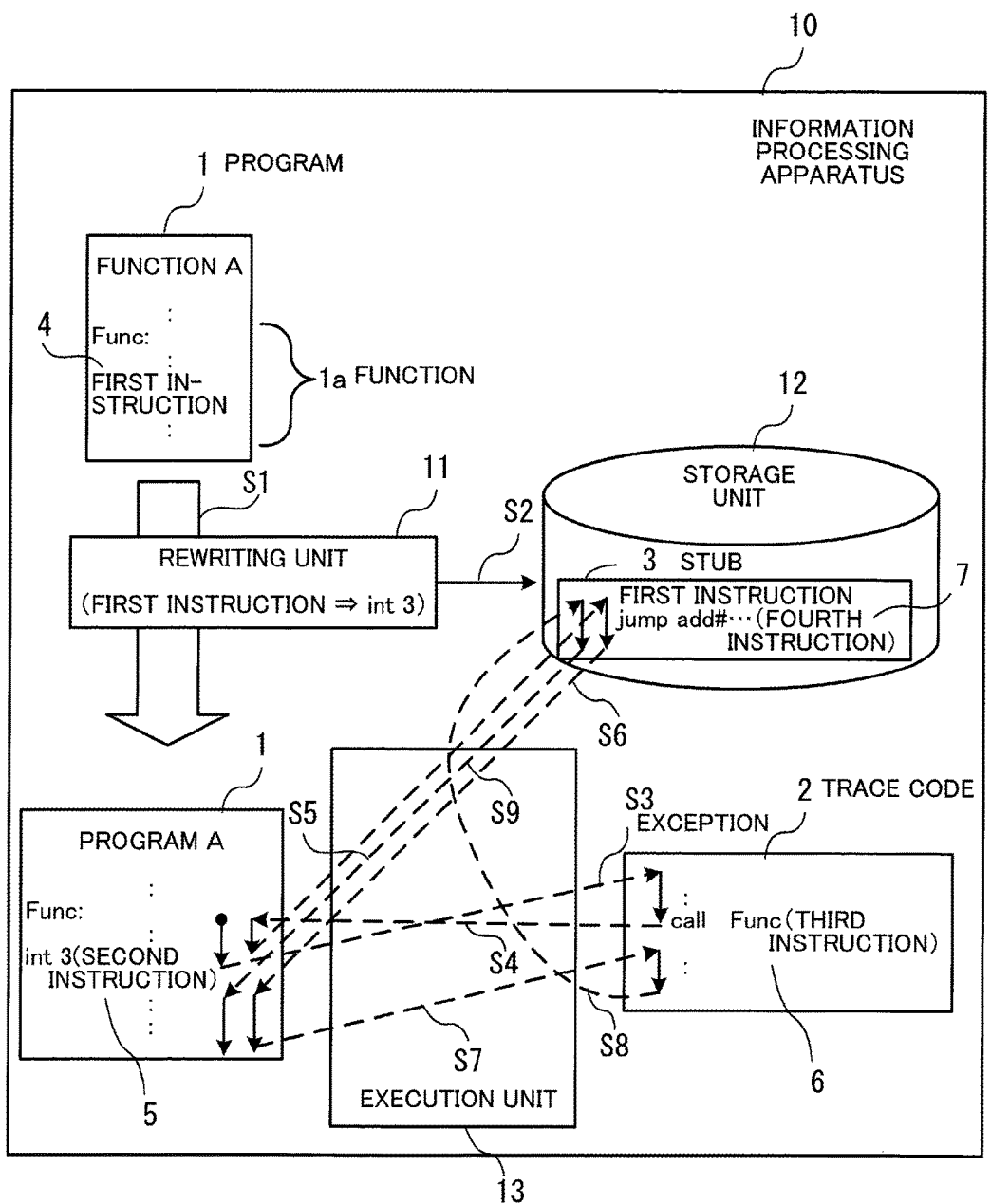
FIG. 1 illustrates an example of an information processing apparatus according to a first embodiment.

Embodiments will now be described with reference to the accompanying drawings, wherein like reference numerals refer to like elements throughout. Plural embodiments may be combined if there is no contradiction between them.

First Embodiment

FIG. 1 illustrates an example of an information processing apparatus according to a first embodiment. An information processing apparatus 10 according to the first embodiment performs a trace process on the basis of a trace code 2 during the execution of a program 1. A trace process is, for example, a process for obtaining the contents of a memory or a register at a determined point of time during the execution of the program 1. In order to realize the trace process, the information processing apparatus 10 includes a rewriting unit 11, a storage unit 12, and an execution unit 13. The information processing apparatus 10 is, for example, a computer including a processor and a memory.

The rewriting unit 11 rewrites a first instruction 4 described at a trace point in a function 1a defined in the program 1 to a second instruction 5 which gives instructions to execute the trace code 2 (step S1). For example, if the trace code 2 is described in a handler which performs exception handling, then the second instruction 5 is an exception instruction. Instruction rewriting is performed in a memory. For example, the program 1 is expanded in the memory and the second instruction 5 is written to a storage area of the memory in which the first instruction 4 is stored. This makes it possible to hook a trace code (adds a process) in the program 1.

A procedure for collecting information to be collected at the time of executing the first instruction 4 in the program 1 is described in the trace code 2. There is a case where performing the function 1a in the program 1 is effective in performing an advanced process in the trace code 2. In that case, a third instruction 6 which calls the function 1a is described in the trace code 2.

Furthermore, the rewriting unit 11 stores in the storage unit 12 the first instruction 4 rewritten to the second instruction 5 (step S2). For example, the rewriting unit 11 generates a stub 3 in which a fourth instruction 7 that gives instructions to jump to an instruction next to the trace point in the program 1 is described right behind the first instruction 4. The rewriting unit 11 then stores the stub 3 in the storage unit 12.

The storage unit 12 stores the first instruction 4. For example, the storage unit 12 stores the stub 3 including the first instruction 4.

The execution unit 13 executes the trace code 2 on the basis of the second instruction 5 at the time of execution at the trace point in the function 1a (step S3). If the second instruction 5 is, for example, an exception instruction, then the execution unit 13 calls the trace code 2 defined as an exception handler, and executes the called trace code 2.

If the third instruction 6 which calls the function 1a is included in the trace code 2, then the execution unit 13 replaces the second instruction 5 at the trace point in the function 1a with the first instruction 4 stored in the storage unit 12 and performs the function 1a, at the time of executing the third instruction 6.

For example, the execution unit 13 calls the function 1a in the program 1 on the basis of the third instruction 6 and performs the function 1a (step S4). At the time when the execution unit 13 executes the second instruction 5 during the performance of the function 1a, the execution unit 13 executes the stub 3 in place of the trace code 2 indicated in the second instruction 5 (step S5).

The first instruction 4 is described in the stub 3. As a result, by executing the stub 3, the first instruction 4 is executed in place of the second instruction 5. After executing the first instruction 4, the execution unit 13 executes the fourth instruction 7 described in the stub 3. The instruction next to the trace point in the function 1a is then executed (step S6).

After that, the execution unit 13 executes instructions in order from the instruction next to the trace point in the function 1a. When the performance of the function 1a ends, the execution of a subroutine based on the third instruction 6 ends. An instruction next to the third instruction 6 in the trace code 2 is then processed (step S7). When the execution of the trace code 2 ends, the execution unit 13 then executes the stub 3 (step S8). By executing the stub 3 after the trace code 2, the first instruction 4 rewritten to the second instruction 5 is executed. When the execution of the stub 3 ends, the instruction next to the trace point in the function 1a is then executed (step S9).

The function 1a can be called in this way in the trace code 2 inserted during the performance of the function 1a in the program 1. That is to say, even if a program is called in the trace code 2, a process does not enter a loop. As a result, restrictions placed on the trace code 2 are lightened and the flexibility of the process performed by the trace code 2 is increased.

For example, if failure analysis is performed, there are various programs under execution to be debugged. A process regarding failure analysis is described in advance in the trace code 2. When a failure occurs during the performance of the function 1a in the program 1, a failure analysis may be performed with a point in the function 1a designated as a trace point. If at this time the process indicated in the first embodiment for preventing the occurrence of a loop is not performed, failure analysis is not performed on the function 1a called in the trace code 2. In computer failure analysis it is desirable that the number of unanalyzable programs be small. Accordingly, another program is not called in the trace code 2 in which a failure analysis process is described. However, if there are restrictions as to programs which can be used for failure analysis, it is difficult to perform an advanced failure analysis. In order to use a process (file access, for example) in particular which is provided by an OS, a function, such as an API, corresponding to the process is called. If the API is not called in an analysis process, it is difficult to perform an advanced failure analysis by utilizing the function of the OS.

By performing the process indicated in the first embodiment, on the other hand, various functions, such as APIs, can be called in the trace code 2 in which a procedure for failure analysis is described. As a result, an advanced failure analysis is performed.

In addition, the trace code 2 is hooked at a trace point in the function 1a. This makes it possible to execute the trace code 2 in the same thread where the function 1a is performed. If they are executed in the same thread, there is no need to perform context switching before and after the beginning of the execution of the trace code 2. Context switching is not performed, so there is no need to change a state at the trace point in which the function 1a is performed. As a result, correct information is traced.

Furthermore, the first instruction 4 is rewritten to the second instruction 5 in the memory, so there is no need to edit the contents of an executable file of the program 1. This makes it possible to perform a trace process without recompiling.

The rewriting unit 11 and the execution unit 13 illustrated in FIG. 1 are realized by, for example, a processor included in the information processing apparatus 10. In addition, the storage unit 12 is realized by, for example, a memory included in the information processing apparatus 10.

Furthermore, lines which connect the components illustrated in FIG. 1 indicate a part of a communication path and a communication path other than that illustrated in FIG. 1 may also be set.

Second Embodiment

A second embodiment will now be described. In the second embodiment information indicative of the state of a computer at the beginning of the execution of an API prepared by an OS is traced (data collection). APIs include programs, such as functions, for utilizing the function of the OS. The function of the OS is utilized by calling an API during the execution of an application program or the like.

Figure 2:
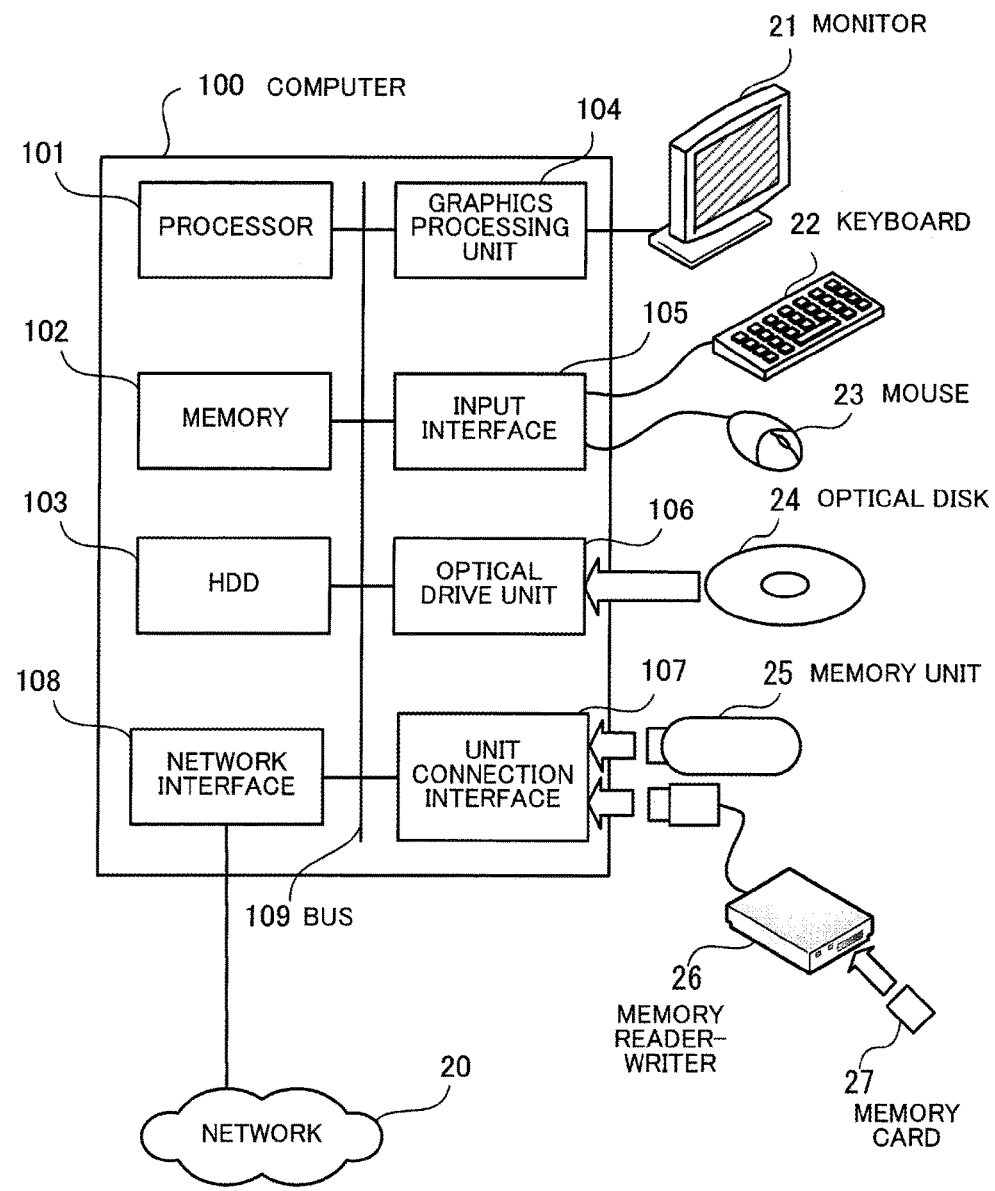
FIG. 2 illustrates an example of the hardware configuration of a computer used in a second embodiment.

FIG. 2 illustrates an example of the hardware configuration of a computer used in a second embodiment. The whole of a computer 100 is controlled by a processor 101. A memory 102 and a plurality of peripheral units are connected to the processor 101 via a bus 109. The processor 101 may be a multiprocessor. The processor 101 is a CPU (Central Processing Unit), a MPU (Micro Processing Unit), a DSP (Digital Signal Processor), or the like. At least a part of the function of the processor 101 may be realized by an electronic circuit such as an ASIC (Application Specific Integrated Circuit) or a PLD (Programmable Logic Device).

The memory 102 is used as main storage of the computer 100. The memory 102 temporarily stores at least a part of an OS program or an application program executed by the processor 101. In addition, the memory 102 stores various pieces of data which the processor 101 needs to perform a process. A volatile semiconductor memory, such as a RAM (Random Access Memory), is used as the memory 102.

The plurality of peripheral units connected to the bus 109 are a HDD (Hard Disk Drive) 103, a graphics processing unit 104, an input interface 105, an optical drive unit 106, a unit connection interface 107, and a network interface 108.

The HDD 103 magnetically writes data to and reads out data from a built-in disk. The HDD 103 is used as auxiliary storage of the computer 100. The HDD 103 stores the OS program, application programs, and various pieces of data. A nonvolatile semiconductor memory, such as a flash memory, may be used as auxiliary storage.

A monitor 21 is connected to the graphics processing unit 104. The graphics processing unit 104 displays an image on a screen of the monitor 21 in accordance with an instruction from the processor 101. The monitor 21 is a display using a CRT (Cathode Ray Tube), a liquid crystal display, or the like.

A keyboard 22 and a mouse 23 are connected to the input interface 105. The input interface 105 transmits to the processor 101 a signal transmitted from the keyboard 22 or the mouse 23. The mouse 23 is an example of a pointing device and another pointing device, such as a touch panel, a tablet, a touch pad, or a track ball, may be used.

The optical drive unit 106 reads data recorded on an optical disk 24 by the use of a laser beam or the like. The optical disk 24 is a portable record medium on which recorded data can be read by the reflection of light. The optical disk 24 is a DVD (Digital Versatile Disc), a DVD-RAM, a CD-ROM (Compact Disc Read Only Memory), a CD-R (Recordable)/RW (ReWritable), or the like.

The unit connection interface 107 is a communication interface used for connecting peripheral units to the computer 100. For example, a memory unit 25 and a memory reader-writer 26 are connected to the unit connection interface 107. The memory unit 25 is a record medium having the function of communicating with the unit connection interface 107. The memory reader-writer 26 is a unit which writes data to or reads out data from a memory card 27. The memory card 27 is a card-type record medium.

The network interface 108 is connected to a network 20. The network interface 108 transmits data to or receives data from another computer or a communication apparatus via the network 20.

By adopting the above hardware configuration, processing functions in the second embodiment are realized. The information processing apparatus 10 according to the first embodiment is also realized by the use of the same hardware that is used in the computer 100 illustrated in FIG. 2.

The computer 100 realizes the processing functions in the second embodiment by executing a program recorded in, for example, a computer-readable record medium. The program in which the contents of a process that are to be performed by the computer 100 are described is recorded in various record media. For example, the program which is to be executed by the computer 100 is stored in the HDD 103. The processor 101 loads at least a part of the program stored in the HDD 103 into the memory 102 and executes it. Furthermore, the program which is to be executed by the computer 100 may be recorded on a portable record medium, such as the optical disk 24, the memory unit 25, or the memory card 27. The program recorded on a portable record medium is installed in the HDD 103 and then is executed, under the control of, for example, the processor 101. In addition, the processor 101 may read out the program directly from a portable record medium and execute it.

Figure 3:
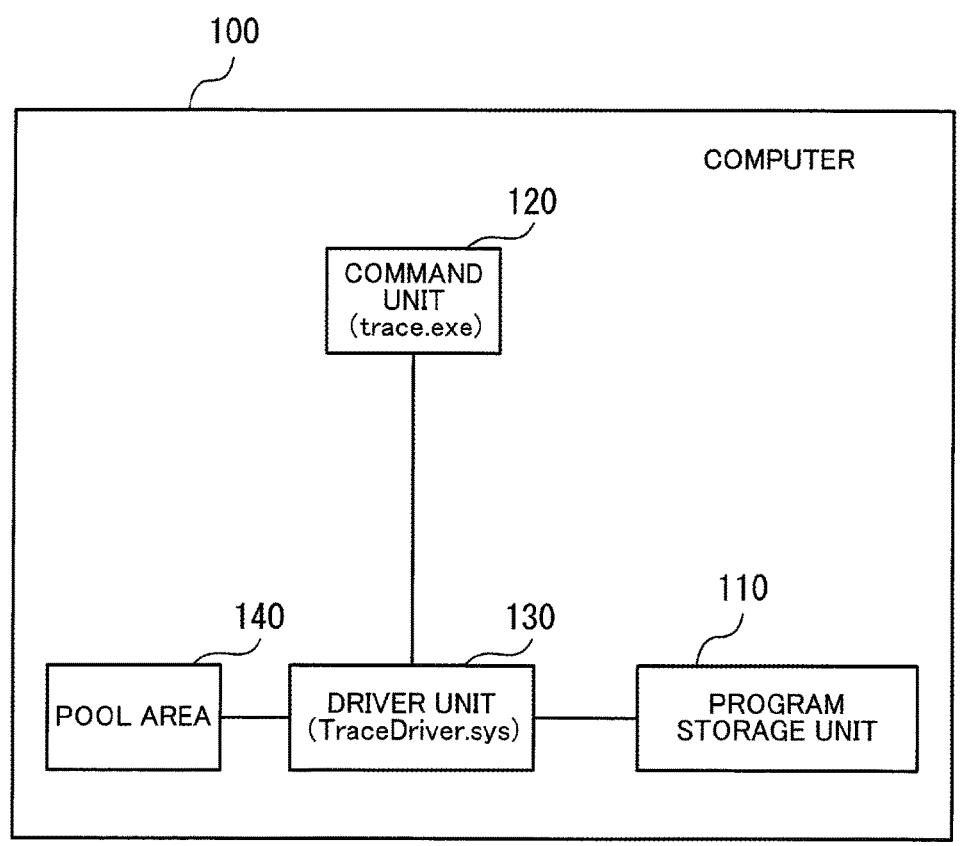
FIG. 3 is a block diagram of an example of a trace function.

FIG. 3 is a block diagram of an example of a trace function. Of the functions of the computer 100, functions related to information collection by trace are extracted in FIG. 3. The computer 100 includes a program storage unit 110, a command unit 120, a driver unit 130, and a pool area 140. The computer 100 has not only the functions illustrated in FIG. 3 but also functions realized by the OS.

The program storage unit 110 stores a program which is a trace object. The program storage unit 110 is, for example, a storage area in the memory 102.

The command unit 120 accepts from a user input of a command which gives instructions to perform trace. The command unit 120 then transmits a trace request to the driver unit 130. Furthermore, the command unit 120 obtains a trace result from the driver unit 130 and outputs a log file including the trace result. The command unit 120 operates when the OS is in user mode.

The driver unit 130 traces a program, which is a trace object, stored in the program storage unit 110 in response to a trace request from the command unit 120. The driver unit 130 stores in the pool area 140 information collected by the trace. The driver unit 130 also stores in the pool area 140 a stub used for the trace. Furthermore, when the driver unit 130 completes the trace, the driver unit 130 transmits a trace result to the command unit 120. The driver unit 130 operates when the OS is in kernel mode.

The pool area 140 is a storage area for trace data and a stub. The pool area 140 is, for example, a storage area in the memory 102.

The computer 100 executes, for example, an executable file whose file name is "trace.exe". By doing so, the function of the command unit 120 is realized. Furthermore, the computer 100 executes, for example, an executable file whose file name is "TraceDriver.sys". By doing so, the function of the driver unit 130 is realized.

Trace is performed on the basis of the above functions.

Figure 4:
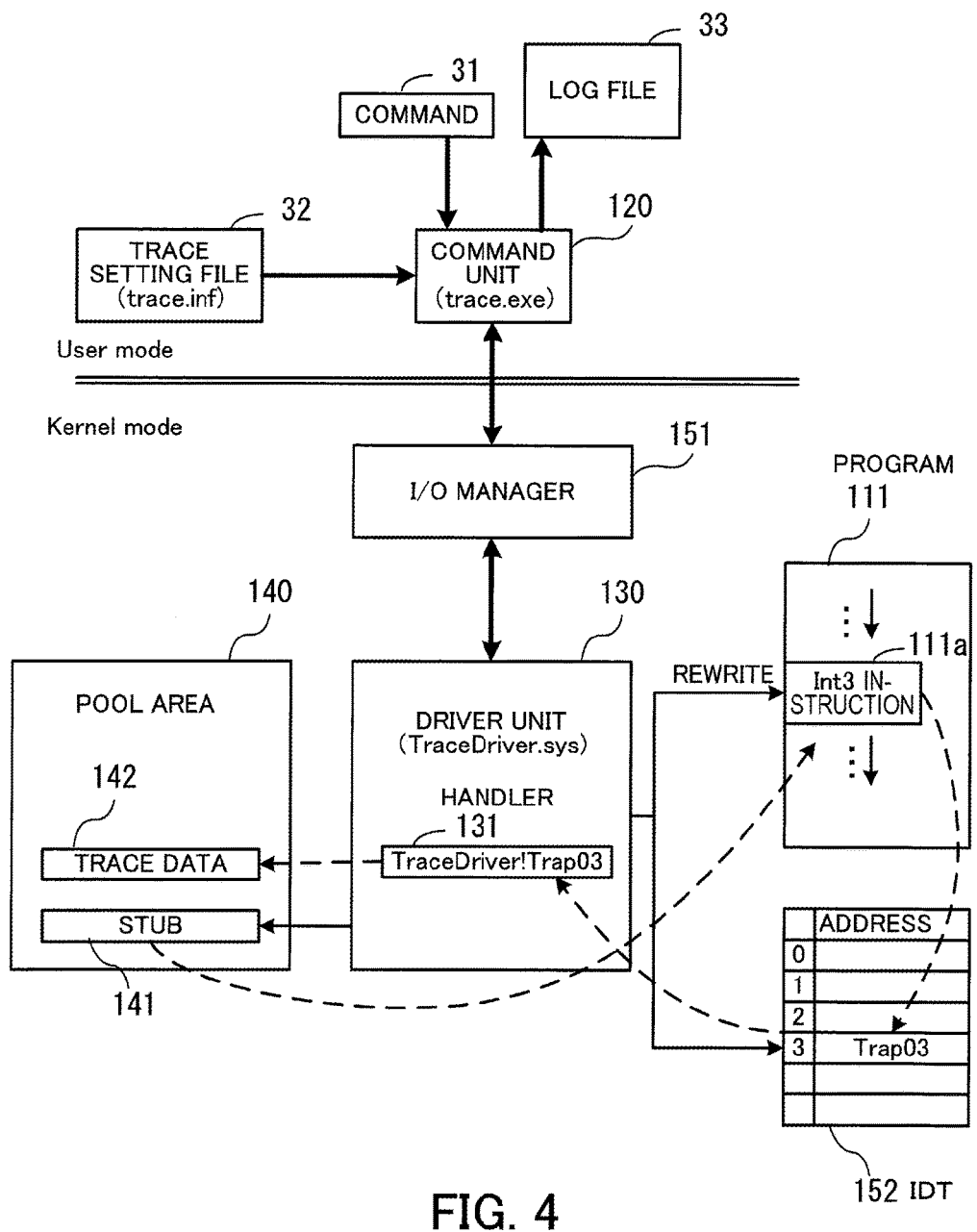
FIG. 4 is a view for giving an outline of a trace process.

FIG. 4 is a view for giving an outline of a trace process. A user operates an input device, such as the keyboard 22, to input a command 31 which gives instructions to perform trace. For example, a program 111 which is a trace object is designated in the command 31. In addition, a trace setting file 32 in which trace performance conditions are defined is designated in the command 31.

The inputted command 31 is accepted by the command unit 120 which operates at the time of the OS being in the user mode. For example, the command unit 120 refers to the trace setting file 32 designated in the command 31, and recognizes the trace performance conditions. The command unit 120 then outputs a trace request including the trace performance conditions.

The trace request is inputted via an I/O manager 151 of the OS to the driver unit 130 which operates at the time of the OS being in the kernel mode. The driver unit 130 performs a trace process in response to the trace request. The trace request is divided broadly into a trace setting process performed at the time of accepting the trace request and a trace data collection process performed at the time of the occurrence of an exception at a trace point. In FIG. 4, the trace setting process is indicated by a solid-line arrow and the trace data collection process is indicated by a dashed-line arrow.

In the trace setting process, the driver unit 130 rewrites an instruction at the trace point in a program 111, which is a trace object, to an interruption instruction 111a. Furthermore, the driver unit 130 rewrites an address of a handler for an exception interruption in an IDT (Interrupt Descriptor Table) 152 to an address of a handler 131 included in the driver unit 130. In addition, the driver unit 130 generates a stub 141 which executes the interruption instruction 111a, and stores it in the pool area 140.

After that, the computer 100 begins to execute the program 111. When an execution point reaches the trace point, the interruption instruction 111a is executed. When the interruption instruction 111a is executed, the IDT 152 is referred to by the OS and the address of the handler 131 corresponding to the interruption instruction 111a is obtained. The execution of the handler 131 is then begun. The handler 131 collects trace data and stores collected trace data 142 in the pool area 140. When the handler 131 completes trace data collection, the handler 131 starts the stub 141. The computer 100 executes the stub 141. After executing the stub 141, the computer 100 executes instructions behind the interruption instruction 111a in the program 111.

The driver unit 130 transmits the trace data 142 to the command unit 120 via the I/O manager 151. The command unit 120 generates a log file 33 including the trace data 142. The log file 33 is stored in, for example, the HDD 103.

Information (such as a value of a register) indicative of the state of a computer at a determined trace point during the execution of a program is collected through the above procedure. Information to be collected is defined in the handler 131. For example, an instruction included in a function, such as an API, defined in the program 111 is designated as a trace point. A trace procedure depends on whether or not the handler 131 calls a function including an instruction designated as a trace point.

Figure 5:
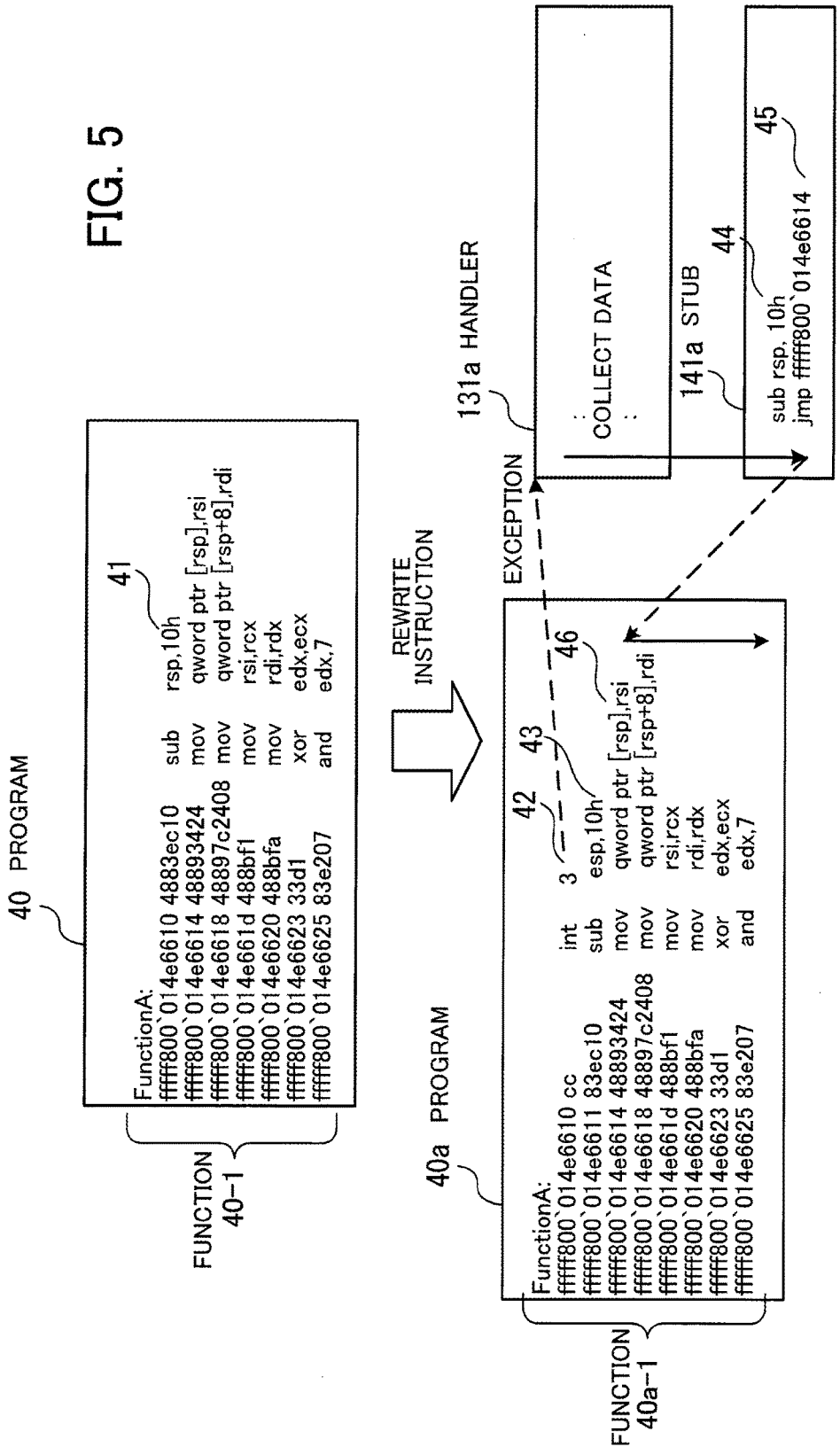
FIG. 5 indicates an example of an instruction at the time of not calling in a handler a function including a trace point.

FIG. 5 indicates an example of an instruction at the time of not calling in a handler a function including a trace point. In the example of FIG. 5, a function 40-1 of "FunctionA" is defined in a program 40. It is assumed that trace is performed at the beginning of the performance of the function 40-1. In this case, an instruction 41 at the head of the function 40-1 is rewritten to an exception instruction 42 in the memory 102. The original instruction 41 is described as "4883ec10" from the address "ffff800'014e6610" in the memory 102. This instruction 41 is expressed as "sub rsp,10h" by mnemonic. The exception instruction 42 after the rewriting is described as "cc" from the address "ffff800'014e6610" in the memory 102. This exception instruction 42 is expressed as "int 3" by mnemonic.

The length of the exception instruction 42 is shorter than the instruction 41 before the rewriting. As a result, the exception instruction 42 overwrites a part of an area in the memory 102 in which the instruction 41 is stored and an incomplete instruction 43 is left in the rest of the area. Accordingly, a stub 141a for executing the original instruction 41 is generated. The stub 141a includes an instruction 44 which is equal in contents to the original instruction 41 which the exception instruction 42 overwrites. Furthermore, a jump instruction 45 which gives instructions to execute a jump to an instruction 46 that is to be executed next to the instruction 41 before the rewriting in the original program 40 is described at the end of the stub 141a.

When a function 40a-1 in a program 40a after the instruction rewriting is performed, the exception instruction 42 is executed first. Accordingly, a handler 131a which treats exception handling is started. Data is collected as a result of the execution of the handler 131a. When the execution of the handler 131a ends, the stub 141a is executed. Therefore, the instruction 44 which is equal in contents to the instruction 41 before the rewriting and which is described in the stub 141a is executed. The jump instruction 45 which gives instructions to execute a jump to the instruction 46 in the program 40a is then executed. After that, instructions in the program 40a are executed from the instruction 46.

A state at the beginning of the performance of a function in the program 40 is traced in this way with the program 40 as a trace object. In the example of FIG. 5, however, a call instruction of the function 40a-1 including a trace point is not included in the handler 131a. If a call instruction of the function 40a-1 is included in the handler 131a, then a process loops by performing the same process that is illustrated in FIG. 5.

Figure 6:
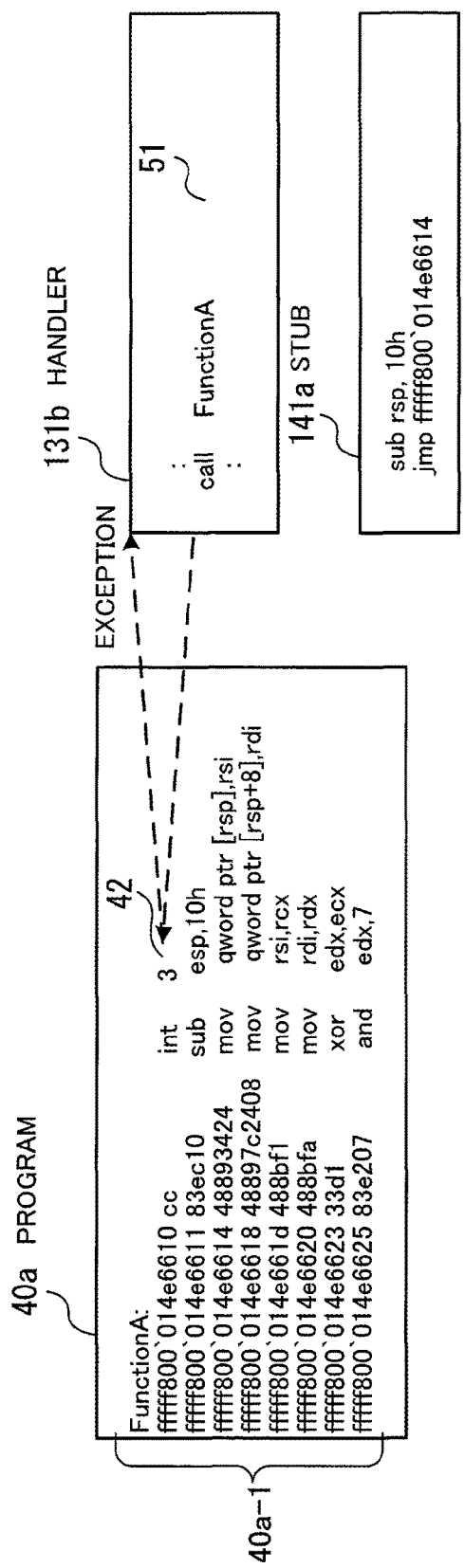
FIG. 6 indicates an example of a loop which occurs in a case where a function including a trace point is called in a handler.

FIG. 6 indicates an example of a loop which occurs in a case where a function including a trace point is called in a handler. In the example of FIG. 6, an instruction 51 which calls the function 40a-1 including a trace point is included in a handler 131b in which the contents of a trace process are described. In this case, when the function 40a-1 is performed during the performance of trace, the exception instruction 42 is executed first. Accordingly, the handler 131b is called. Instructions in the called handler 131b are executed from the leading instruction. When the instruction 51 is executed, the function 40a-1 is called and the leading exception instruction 42 is executed. As a result, exception handling occurs again and the handler 131b is called.

If the program, which is a trace object, is called in this way in the handler 131*b*, loop processing is repeated. If a process loops many times, a recursive interruption is repeated and a stack which manages a process call overflows. As a result, a trace process terminates due to an error.

When the function 40*a*-1, which is a trace object, is called in the handler 131*b*, a call destination is changed to the stub 141*a* in the second embodiment. This prevents the occurrence of the loop indicated in FIG. 6. A change in call destination in the handler 131*b* is realized, for example, by changing the contents of an IAT (Import Address Table). The IAT is a data table in which a leading address of an API defined by an external file is described.

FIG. 7 indicates an example of calling a program, which is a trace object, in a handler in the second embodiment. The driver unit 130 includes a data section 132, a code section 133, an IAT 134, and the like. The data section 132 stores data which the driver unit 130 uses for performing a process. The code section 133 stores a program code which indicates the contents of a process which the driver unit 130 performs. The code section 133 also stores the handler 131*b*. A leading address of an API which the driver unit 130 uses for performing a process is set in the IAT 134 and is associated with a name of the API.

It is assumed that trace is performed with the function 40*a*-1 as a trace object. If the handler 131*b* includes the call instruction 51 of the function 40*a*-1, then the driver unit 130 rewrites the IAT 134. For example, the driver unit 130 changes the leading address "ffff800'014e6610" associated with the name "FunctionA" of the function 40*a*-1 to a leading address of the stub 141*a*.

When after that the function 40*a*-1 is performed, the handler 131*b* is called by the exception instruction 42. The handler 131*b* is then executed and data is collected. When the call instruction 51 of the function 40*a*-1 included in the handler 131*b* is executed, the IAT 134 is referred to and a program at an address associated with an API name indicated by the call instruction 51 is called. This address is changed in advance to a leading address of the stub 141*a*. Accordingly, the stub 141*a* is called and is executed.

The stub 141*a* is executed. As a result, the instruction 44 which is equal in contents to the instruction 41 which the exception instruction 42 overwrites is executed, and the process makes a transition to the instruction 46 in the function 40*a*-1. After that, the instruction 46 and the subsequent instructions in the function 40*a*-1 are executed. When the function 40*a*-1 is performed to the end, the process makes a transition to the handler 131*b* which is a call source.

When the performance of the function 40*a*-1 based on the call from the handler 131*b* ends, remaining processes in the handler 131*b* are performed. When the execution of the handler 131*b* is completed, the instruction 44 in the stub 141*a* is executed. Next, a jump to the instruction 46 in the function 40*a*-1 is executed by the jump instruction 45. After that, the instruction 46 and the subsequent instructions in the function 40*a*-1 are executed.

The trace setting process will now be described in detail. The trace setting process is performed on the basis of the trace setting file 32.

FIG. 8 indicates an example of a trace setting file. For example, data buffer size and a trace point are designated in the trace setting file 32. In the example of FIG. 8, the size of a data buffer which stores collected data is set in the [SETTING] column. In addition, a trace point is designated in the [TRACEPOINT] column. For example, a trace point is designated by the name (symbol name) of a program which is a trace object. If a trace point is indicated only by a symbol name, a trace point is the position of the head of a program corresponding to the symbol name. Furthermore, a trace point may be designated by an address in a memory.

A procedure for the trace setting process will now be described.

Figure 9:
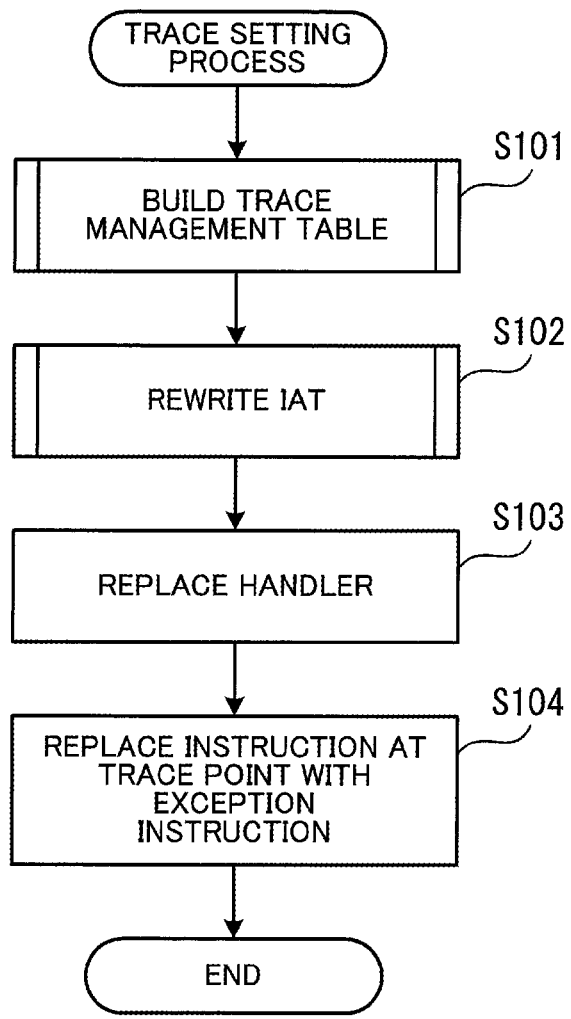
FIG. 9 is a flow chart of an example of a procedure for a trace setting process.

FIG. 9 is a flow chart of an example of a procedure for the trace setting process.

(Step S101) The driver unit 130 builds a trace management table. A trace management table is a data table used for managing an instruction at a trace point and an address of a stub used for executing the instruction. The details of a trace management table building process will be described later (see FIG. 11).

(Step S102) The driver unit 130 rewrites the IAT 134. The details of an IAT rewriting process will be described later (see FIG. 13). The contents of the IAT 134 after the rewriting are restored to the original contents when an information analysis involving a trace process ends.

(Step S103) The driver unit 130 replaces a handler. For example, the driver unit 130 updates the set contents of the OS so that the handler 131*b* which performs the trace process will be executed at the time of the occurrence of exception handling.

(Step S104) The driver unit 130 replaces an instruction described at an address, which is a trace point, with an exception instruction.

An environment in which trace is performed is prepared through the above procedure. The trace point is indicated in the trace management table.

FIG. 10 indicates an example of the trace management table. A trace management table 60 includes Trace Address, Original Instruction, and Stub Address columns. An address (trace address) in the memory 102 at which an instruction, which is a trace point, is stored is set in the Trace Address column. An instruction which is described at a trace address and which is rewritten to an exception instruction is set in the Original Instruction column. A leading address of a stub used for executing an original instruction is set in the Stub Address column.

The trace management table building process will now be described in detail.

Figure 11:
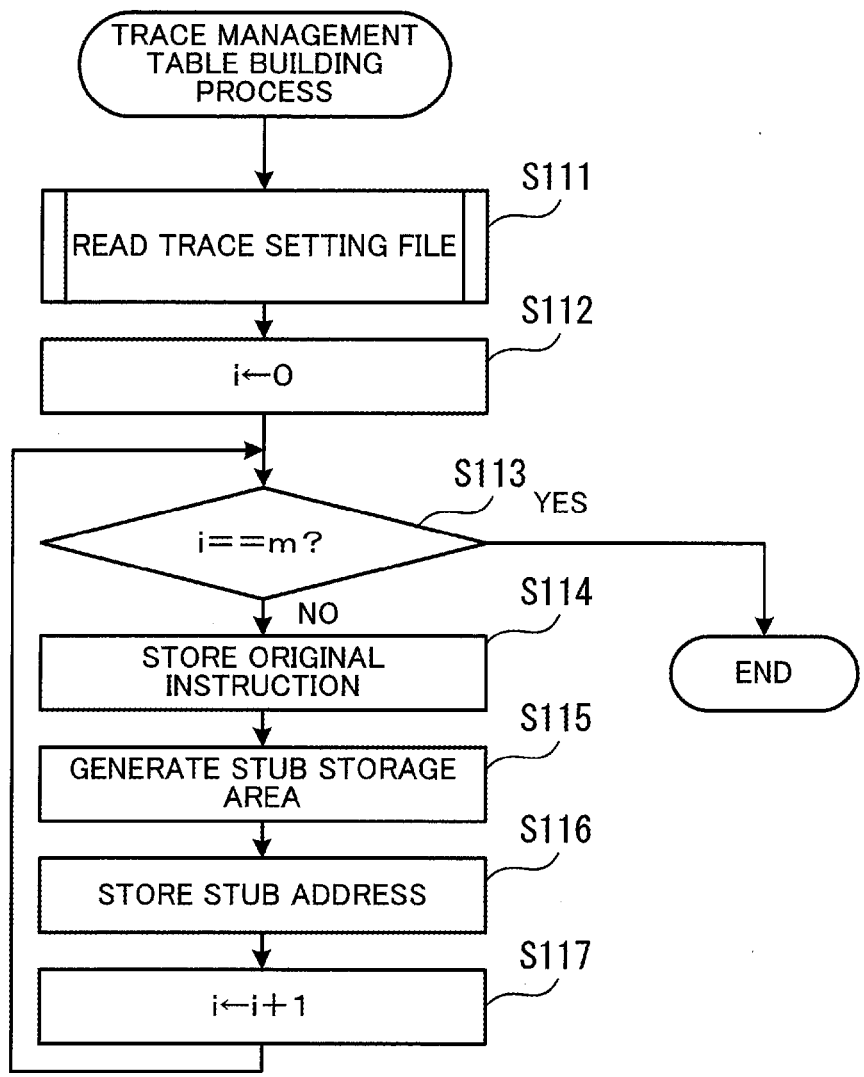
FIG. 11 is a flow chart of a procedure for a trace management table building process.

FIG. 11 is a flow chart of a procedure for the trace management table building process.

(Step S111) The driver unit 130 performs a trace setting file read process. By doing so, an address of a trace point is set in the Trace Address column of the trace management table 60. The details of the trace setting file read process will be described later (see FIG. 12). It is assumed that the number of trace points set in the trace management table 60 is m (m is an integer greater than or equal to 1).

(Step S112) The driver unit 130 sets a variable i to 0.

(Step S113) The driver unit 130 determines whether or not the value of i is equal to the trace point number m. If the value of i is equal to the trace point number m, then the trace management table building process ends. If the value of i is not equal to the trace point number m, then the driver unit 130 proceeds to step S114.

(Step S114) The driver unit 130 stores an instruction described at a trace point in an ith record in the trace management table 60 in the Original Instruction column in the record.

(Step S115) The driver unit 130 generates a stub storage area in the memory 102.

(Step S116) The driver unit 130 stores a leading address of the stub storage area in the Stub Address column in the ith record in the trace management table 60.

(Step S117) The driver unit 130 adds 1 to the value of i and proceeds to step S113.

A procedure for the trace setting file read process will now be described.

Figure 12:
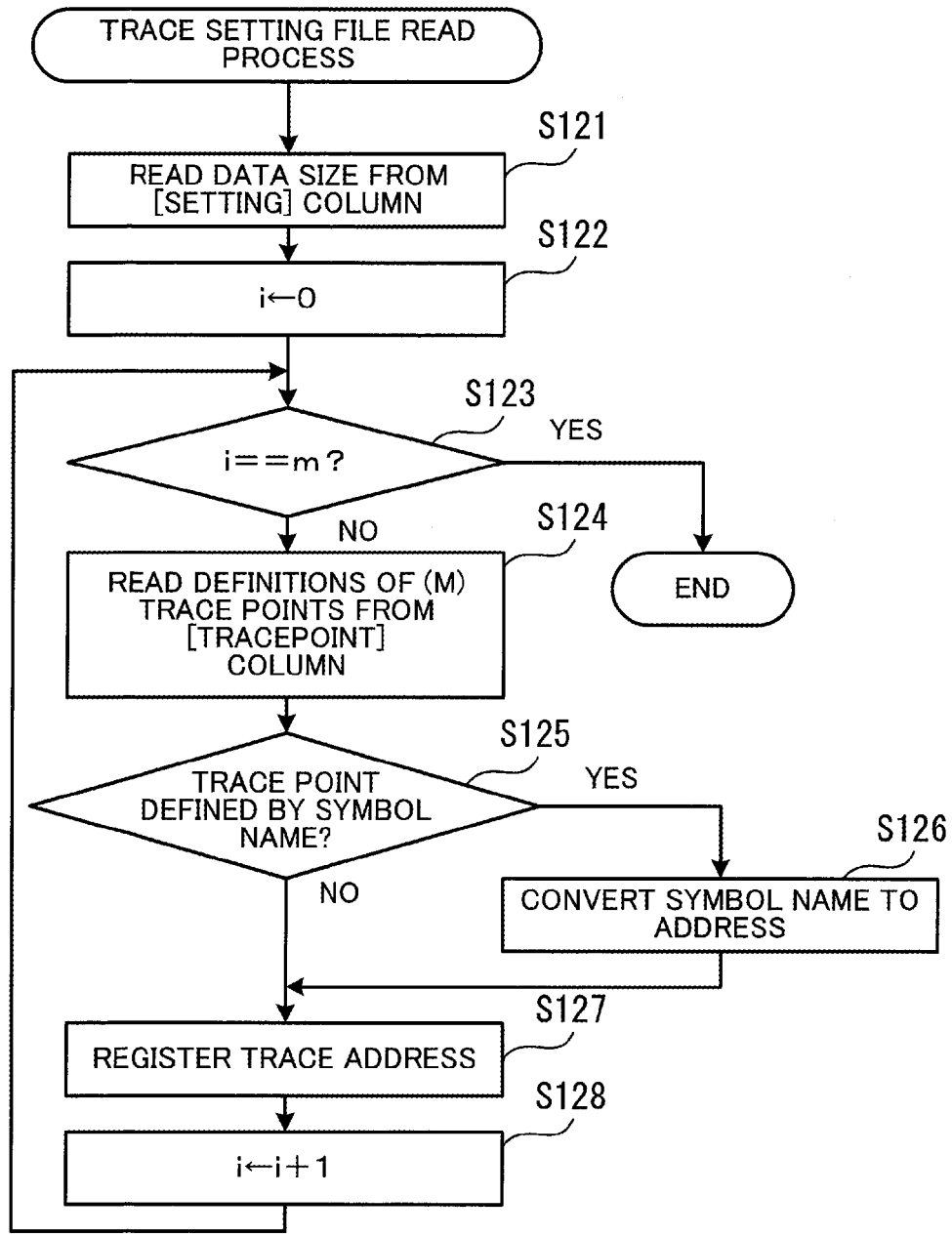
FIG. 12 is a flow chart of an example of a procedure for a trace setting file read process.

FIG. 12 is a flow chart of an example of a procedure for the trace setting file read process.

(Step S121) The driver unit 130 reads data size from the [SETTING] column of the trace setting file 32. The driver unit 130 reserves a storage area corresponding to the read data size in the memory 102 as a storage area for the trace data 142 (see FIG. 4).

(Step S122) The driver unit 130 sets the variable i to 0.

(Step S123) The driver unit 130 determines whether or not the value of i is equal to the trace point number m. If the value of i is equal to the trace point number m, then the trace management table building process ends. If the value of i is not equal to the trace point number m, then the driver unit 130 proceeds to step S124.

(Step S124) The driver unit 130 reads definition information for an ith trace point from definition lines of the m trace points set in the [TRACEPOINT] column of the trace setting file 32.

(Step S125) The driver unit 130 determines whether or not the trace point is defined by a symbol name. If the trace point is defined by a symbol name, then the driver unit 130 proceeds to step S126. If the trace point is defined by an address, then the driver unit 130 proceeds to step S127.

(Step S126) The driver unit 130 converts the symbol name to an address. For example, the driver unit 130 obtains a leading address of a program (which may be an API such as a function) corresponding the symbol name from the OS by the use of an API prepared by the OS. The driver unit 130 then recognizes the obtained address as a trace address of the ith trace point.

(Step S127) The driver unit 130 registers the trace address of the ith trace point in the trace management table 60.

(Step S128) The driver unit 130 adds 1 to the value of i and proceeds to step S123.

By performing the processes indicated in FIGS. 11 and 12, the trace management table 60 is built. When the trace management table 60 is built, the IAT 134 is rewritten.

Figure 13:
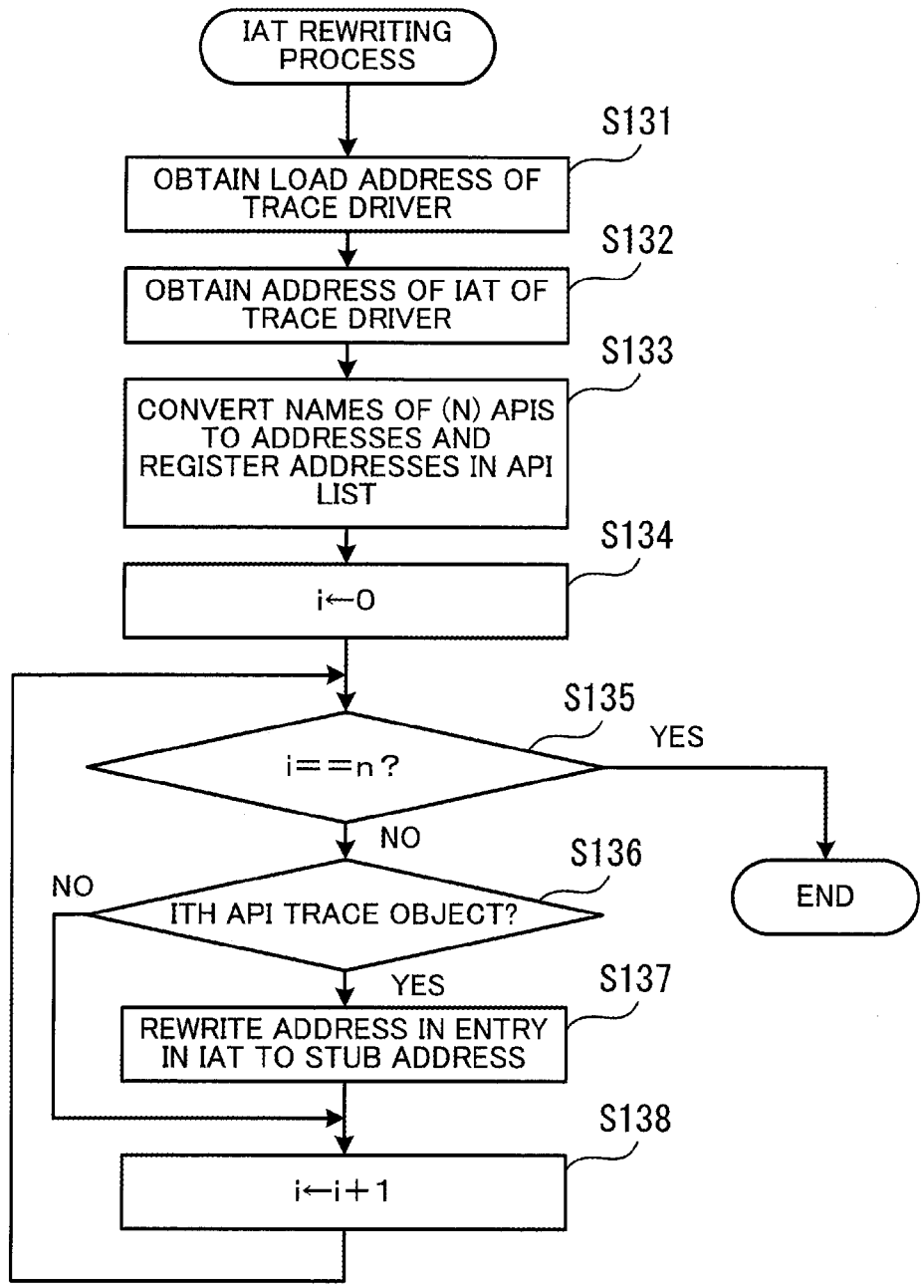
FIG. 13 is a flow chart of an example of a procedure for an IAT rewriting process.

FIG. 13 is a flow chart of an example of a procedure for an IAT rewriting process.

(Step S131) The driver unit 130 obtains from the OS a load address (leading address of the executable file written to the memory) of the executable file (TraceDriver.sys) in which the contents of a process performed by the driver unit 130 are described.

(Step S132) The driver unit 130 analyzes the executable file in which the contents of the process performed by the driver unit 130 are described, and obtains an address of an area in which the IAT 134 is stored.

(Step S133) On the basis of the IAT 134, the driver unit 130 constructs a list (API list) of APIs used in a handler. For example, the driver unit 130 converts the names of APIs used in a handler to addresses and sorts the addresses in numerical order.

Figure 14:
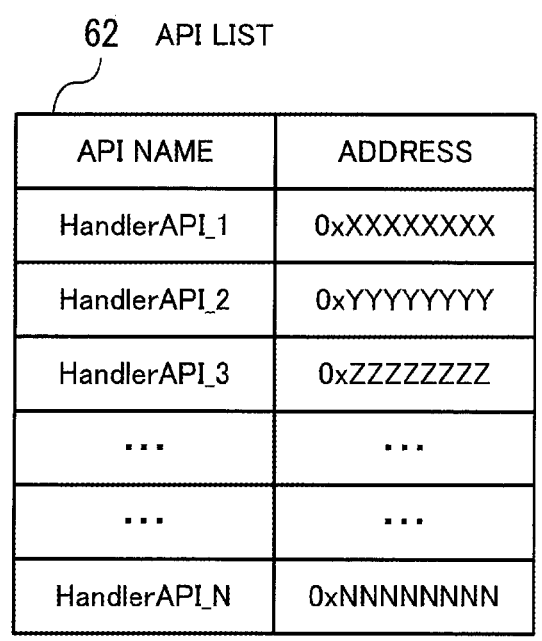
FIG. 14 indicates an example of an API list.

FIG. 14 indicates an example of the API list. An API list 62 includes API Name and Address columns. The name of an API used in the handler 131b is set in the API Name column. An address of an area in which a corresponding function, such as an API, is stored is set in the Address column. A combination of an API name and an address is obtained from the IAT 134. Records each of which is formed of a combination of an API name and an address are sorted so that addresses will be arranged, for example, in ascending order. It is assumed that the number of APIs registered in the API list 62 is n (n is an integer greater than or equal to 1).

But to return, FIG. 13 will be described.

(Step S134) The driver unit 130 sets the variable i to 0.

(Step S135) The driver unit 130 determines whether or not the value of i is equal to the API number n. If the value of i is equal to the API number n, then the IAT rewriting process ends. If the value of i is not equal to the API number n, then the driver unit 130 proceeds to step S136.

(Step S136) The driver unit 130 determines whether or not an ith API in the API list 62 is a trace object. For example, if an address which is the same as an address of the ith API is registered in the Trace Address column of the trace management table 60, then the driver unit 130 determines that the ith API is a trace object. If the ith API is a trace object, then the driver unit 130 proceeds to step S137. If the ith API is not a trace object, then the driver unit 130 proceeds to step S138.

(Step S137) The driver unit 130 rewrites an address in an entry in the IAT 134 corresponding to the ith API in the API list 62 to a stub address corresponding to the ith API. For example, the driver unit 130 obtains from the trace management table 60 a record in which the address of the ith API in the API list 62 is a trace address. Next, the driver unit 130 extracts a stub address from the obtained record. The driver unit 130 then rewrites an address in an entry in the IAT 134 corresponding to the ith API in the API list 62 to the extracted stub address.

(Step S138) The driver unit 130 adds 1 to the value of i and proceeds to step S135.

The IAT 134 is rewritten in this way. As indicated in FIG. 9, after that handler replacement and instruction replacement at a trace point are performed. By doing so, trace setting is completed. When after that an API, which is a trace object, is called, an exception instruction is executed. As a result, a trap exception handling is begun.

Figure 15:
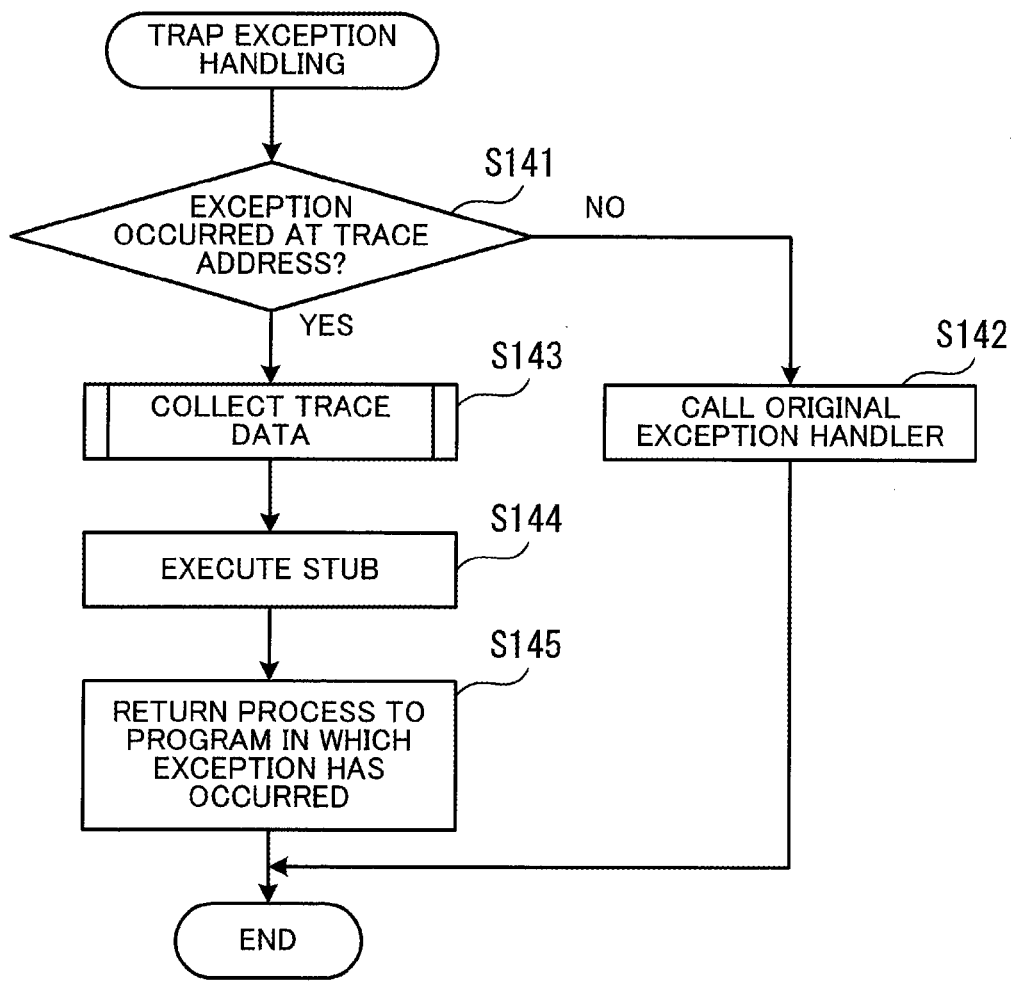
FIG. 15 is a flow chart of an example of a procedure for trap exception handling.

FIG. 15 is a flow chart of an example of a procedure for trap exception handling.

(Step S141) The driver unit 130 determines whether or not the exception has occurred at a trace address. For example, the driver unit 130 refers to the trace management table 60. If an address of an exception instruction which causes the occurrence of the exception is registered as a trace address, then the driver unit 130 determines that the exception has occurred at the trace address. If the exception has occurred at the trace address, then the driver unit 130 proceeds to step S143. If the exception has occurred at an address other than the trace address, then the driver unit 130 proceeds to step S142.

(Step S142) If the exception has occurred at an address other than the trace address, then the driver unit 130 calls an exception handler before the replacement in step S103 (see FIG. 9). The called exception handler is executed and exception handling not involving a trace process is performed. After that, the trap exception handling ends.

(Step S143) The driver unit 130 performs a trace data collection process on the basis of the handler 131b. The details of the trace data collection process will be described later (see FIG. 16).

(Step S144) The driver unit 130 executes a stub corresponding to a function which is a trace object. For example, a jump instruction which gives instructions to execute a jump to the head of the stub 141a is described in the handler 131b as the last instruction. The driver unit 130 executes this instruction. This makes an object of the process make a transition to the stub 141a. The driver unit 130 executes an instruction described in the stub 141a.

(Step S145) The driver unit 130 returns the process to a program in which the exception has occurred. As a result, instructions are executed from an instruction at an address next to the address at which the exception has occurred in a thread in which the program in which the exception has occurred is executed.

The trace data collection process will now be described in detail.

Figure 16:
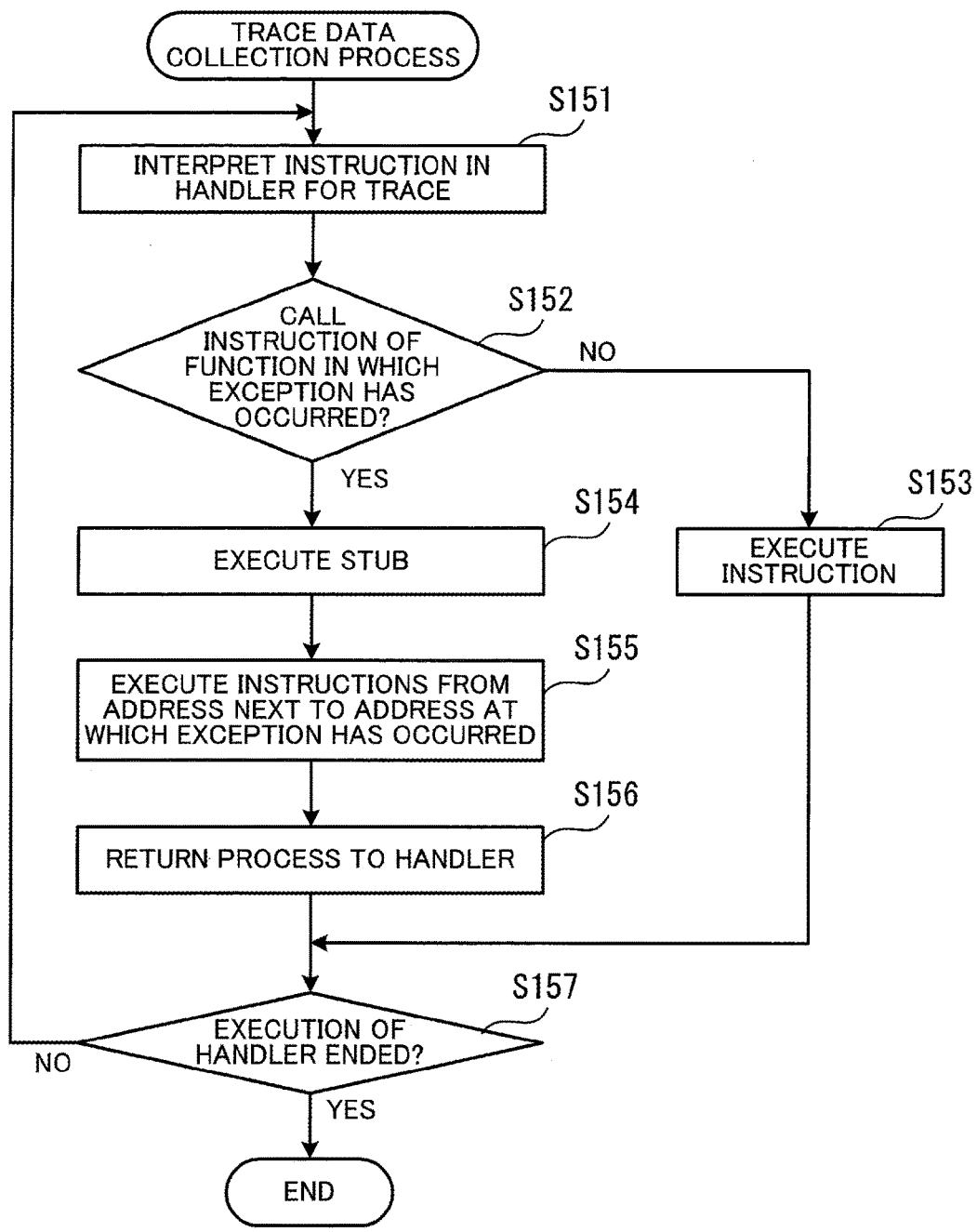
FIG. 16 is a flow chart of an example of a procedure for a trace data collection process.

FIG. 16 is a flow chart of an example of a procedure for the trace data collection process.

(Step S151) The driver unit 130 calls the handler 131b and interprets an instruction to be executed next in the handler 131b.

(Step S152) The driver unit 130 determines whether or not the instruction to be executed next in the handler 131b is a call instruction of a function (API) in which an exception has occurred. If the instruction to be executed next in the handler 131b is a call instruction of the function (API) in which the exception has occurred, then the driver unit 130 proceeds to step S154. If the instruction to be executed next in the handler 131b is not a call instruction of the function (API) in which the exception has occurred, then the driver unit 130 proceeds to step S153.

(Step S153) If the instruction to be executed next in the handler 131b is not a call instruction of the function in which the exception has occurred, then the driver unit 130 executes it. After that, the driver unit 130 proceeds to step S157.

(Step S154) If the instruction to be executed next in the handler 131b is a call instruction of the function in which the exception has occurred, then the driver unit 130 executes a stub corresponding to the function. For example, the driver unit 130 refers to the IAT 134 and obtains a set stub address associated with the function in which the exception has occurred. The driver unit 130 then executes an instruction in a stub stored at the obtained stub address. An instruction replaced with an exception instruction in the function in which the exception has occurred and a jump instruction which gives instructions to execute a jump to an instruction next to the exception instruction in the function in which the exception has occurred are described in the stub. Accordingly, when the driver unit 130 executes the stub, the instruction replaced with the exception instruction is executed and a jump to the instruction next to the exception instruction in the function in which the exception has occurred is executed.

(Step S155) The driver unit 130 executes instructions from an instruction at an address next to an address at which the exception has occurred in the function in which the exception has occurred.

(Step S156) When the function in which the exception has occurred is performed to the end, the driver unit 130 returns the process to the handler 131b.

(Step S157) The driver unit 130 determines whether or not the execution of the handler 131b has ended. If there is an instruction which is not yet executed, then the driver unit 130 proceeds to step S151. If the execution of the handler 131b has ended, then the trace data collection process ends.

As has been described, even when a function, such as an API, set as a trace point is called in the handler 131b which collects trace data, a process does not enter a loop. This makes it possible to use various functions, such as APIs, of the OS in the handler 131b. As a result, a highly flexible trace data collection process is performed. For example, if an API for file access is called in the handler 131b for trace, then trace data saved in the memory 102 is written properly to another record medium, such as the HDD 103. As a result, the amount of collectable trace data does not depend on the capacity of the pool area 140 and a large amount of trace data can be collected.

Furthermore, in the second embodiment the stub 141a is executed at the time of executing a call instruction of the function 40a-1 in the handler 131b only by rewriting the IAT 134 in advance. The instruction 44 which the exception instruction 42 overwrites is executed through a simple procedure. Accordingly, processing efficiency at the time of a trace process does not decrease.

In addition, a handler in which a trace code is described is hooked in a program. By doing so, the handler is executed. This makes it possible to execute the handler in the same thread where a function including a trace point is performed. As a result, context switching is not performed at the time of executing the handler. Accordingly, the contents of a register or a memory in a state in which the function is performed are maintained. As a result, a state at the time of the function being performed is traced correctly.

Moreover, when an instruction at a trace point is rewritten, the rewriting is performed in a memory. As a result, there is no need to edit the contents of an executable file of the program. This makes it possible to perform a trace process without recompiling the program.

Furthermore, a function, such as an API, which is prepared by the OS and which operates in a kernel may be designated as a function which is a trace object. Accordingly, a state in which a function that operates in the kernel is performed is also traced.

Third Embodiment

A third embodiment will now be described. In the third embodiment any point in a function, such an API, may be set as a trace point. Parts of the third embodiment which differ from the second embodiment will now be described.

Figure 17:
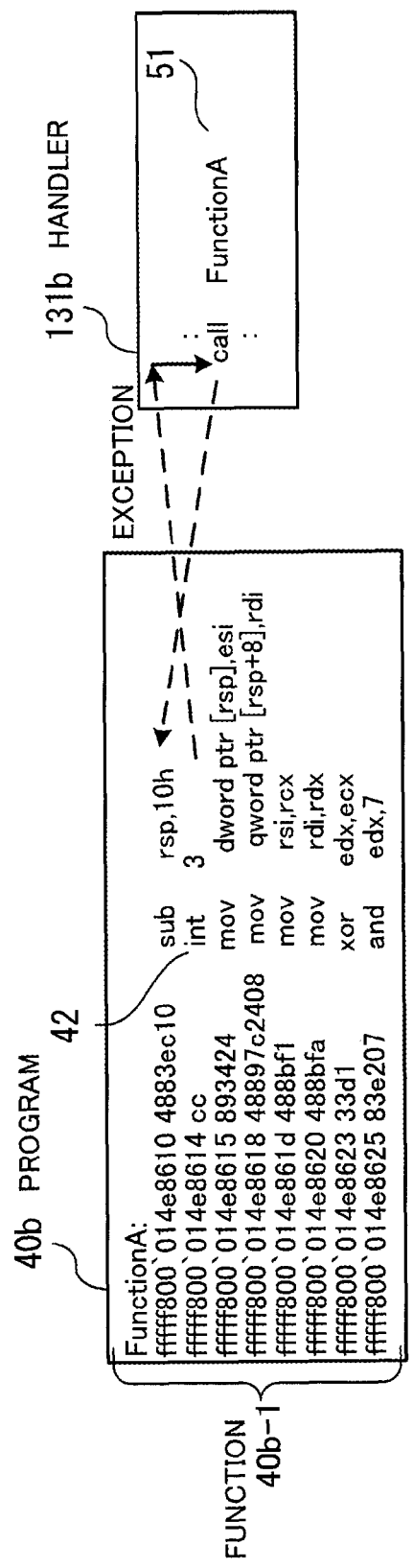
FIG. 17 indicates an example of a loop which occurs in a case where a point other than a head is set as a trace point.

FIG. 17 indicates an example of a loop which occurs in a case where a point other than a head is set as a trace point. In the example of FIG. 17, a second instruction from the head of the function 40-1 indicated in FIG. 5 is set as a trace point. In this case, an instruction in the second line of the function 40-1 is rewritten to the exception instruction 42. When a function 40b-1 in a program 40b after the instruction rewriting is performed, a handler 131b is called by the exception instruction 42. A call instruction 51 of the function 40b-1 is included in the handler 131b. In this case, when the call instruction 51 is executed, the function 40b-1 is called and the exception instruction 42 is executed again. As a result, the process enters a loop.

The handler 131b is executed in a form in which it is hooked in the program 40b. A process indicated in FIG. 17 is performed in one thread. That is to say, even when the function 40b-1 is called repeatedly and the exception instruction 42 is executed many times, thread ID (TID) for threads in which the exception instruction 42 is executed are the same. Accordingly, in the third embodiment the driver unit 130 counts the number of times a call is made from the same thread on the basis of TID for a thread from which the handler 131b for exception handling is called. The driver unit 130 then performs a process according to the number of times a handler is called from a specific thread. This prevents the occurrence of a loop.

Figure 18:
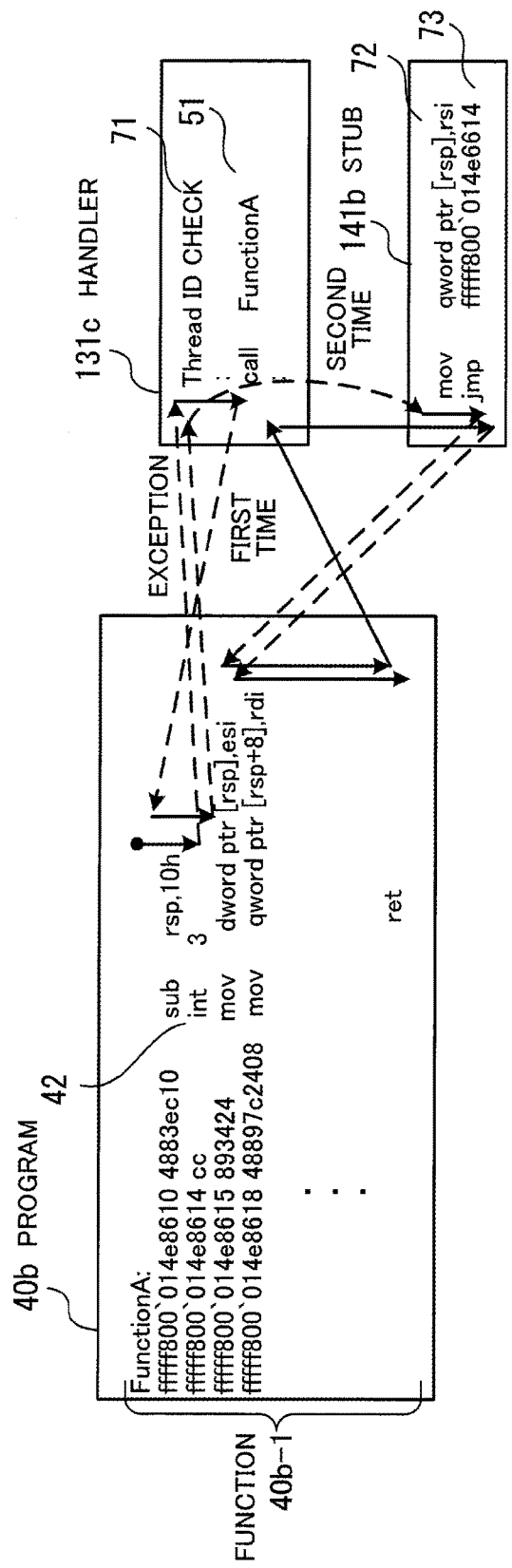
FIG. 18 indicates an example of calling a function, which is a trace object, from a handler in a third embodiment.

FIG. 18 indicates an example of calling a function, which is a trace object, from a handler in the third embodiment. The performance of the function 40b-1 is begun. When a performance point reaches the exception instruction 42, an exception occurs and a handler 131c is called.

A TID check instruction 71 is described at the head of the handler 131c. By executing the TID check instruction 71, TID for a thread (in which the program 40b is executed) from which the handler 131c is called is obtained. The obtained TID is then stored in the memory 102. In addition, whether or not the same TID was formerly obtained is determined.

When a first call is made, the determination that the same TID was not formerly obtained is made. In this case, instructions in the handler 131c are executed from next to the TID check instruction 71. When the instruction 51 which calls the function 40b-1 is executed, the function 40b-1 is called.

When the function 40b-1 is called, the function 40b-1 is performed from the head. When a performance point reaches the exception instruction 42, an exception occurs again and the handler 131c is called. When the handler 131c is called, the TID check instruction 71 is executed first. When the TID check instruction 71 is executed, the determination that a second call is made from the function 40b-1 is made on the basis of TID for a thread from which a call is made. If a second call is made, then a stub 141b is called instead of performing a data collection process indicated in the handler 131c.

An instruction 72 rewritten to the exception instruction 42 and a jump instruction 73 which gives instructions to execute a jump to an instruction next to the exception instruction 42 are described in the stub 141b. Therefore, when the stub 141b is executed, the process jumps to the instruction next to the exception instruction 42 in the function 40b-1 after the instruction 72 is executed. Instructions in the function 40b-1 are then executed from the instruction to which the process jumps.

When the function 40b-1 is performed to the end, the process is returned to a call source (instruction 51 in the handler 131c) from which the function 40b-1 is called. Instructions in the handler 131c are then executed from next to the instruction 51 and data is collected. When the execution of the handler 131c ends, the instruction 72 in the stub 141b is executed. After that, the process jumps to the instruction next to the exception instruction 42 in the function 40b-1 by the jump instruction 73. Instructions in the function 40b-1 are then executed from the instruction to which the process jumps.

As has been described, the number of times the handler 131c is called from the same thread is known by managing TID. If a second call is made, then performing a data collection process in the handler 131c is omitted. This prevents the occurrence of a loop.

In the third embodiment a point in the function 40b-1 other than the head can be designated as a trace point in a trace setting file.

FIG. 19 indicates an example of a trace setting file in the third embodiment. In a trace setting file 32a, a trace point is designated by a name of a function, which is a trace object, and an offset of a trace point from the head in the function (symbol name and offset). In this case, a point which is the designated offset away from the head in the function, which is a trace object, is a trace point.

A trace setting process will now be described.

Figure 20:
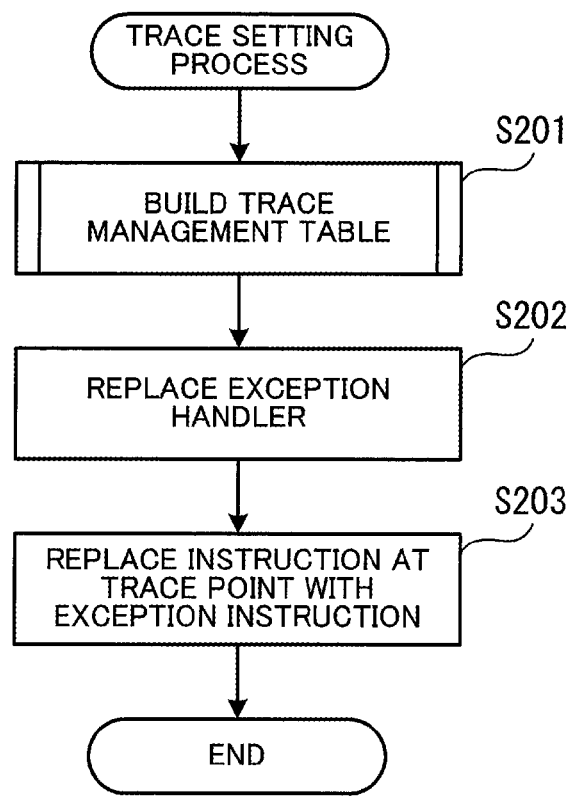
FIG. 20 is a flow chart of an example of a procedure for a trace setting process in the third embodiment.

FIG. 20 is a flow chart of an example of a procedure for a trace setting process in the third embodiment. In the third embodiment the driver unit 130 builds a trace management table (step S201), replaces an exception handler (step S202), and replaces an instruction at a trace point with an exception instruction (step S203). Steps S201 through S203 are the same as steps S101, S103, and S104, respectively, of the trace setting process in the second embodiment indicated in FIG. 9. That is to say, the trace setting process in the second embodiment from which the IAT rewriting process (step S102) is excluded corresponds to the trace setting process in the third embodiment.

A procedure for a trap exception handling performed at the time of exception handling being performed will now be described.

Figure 21:
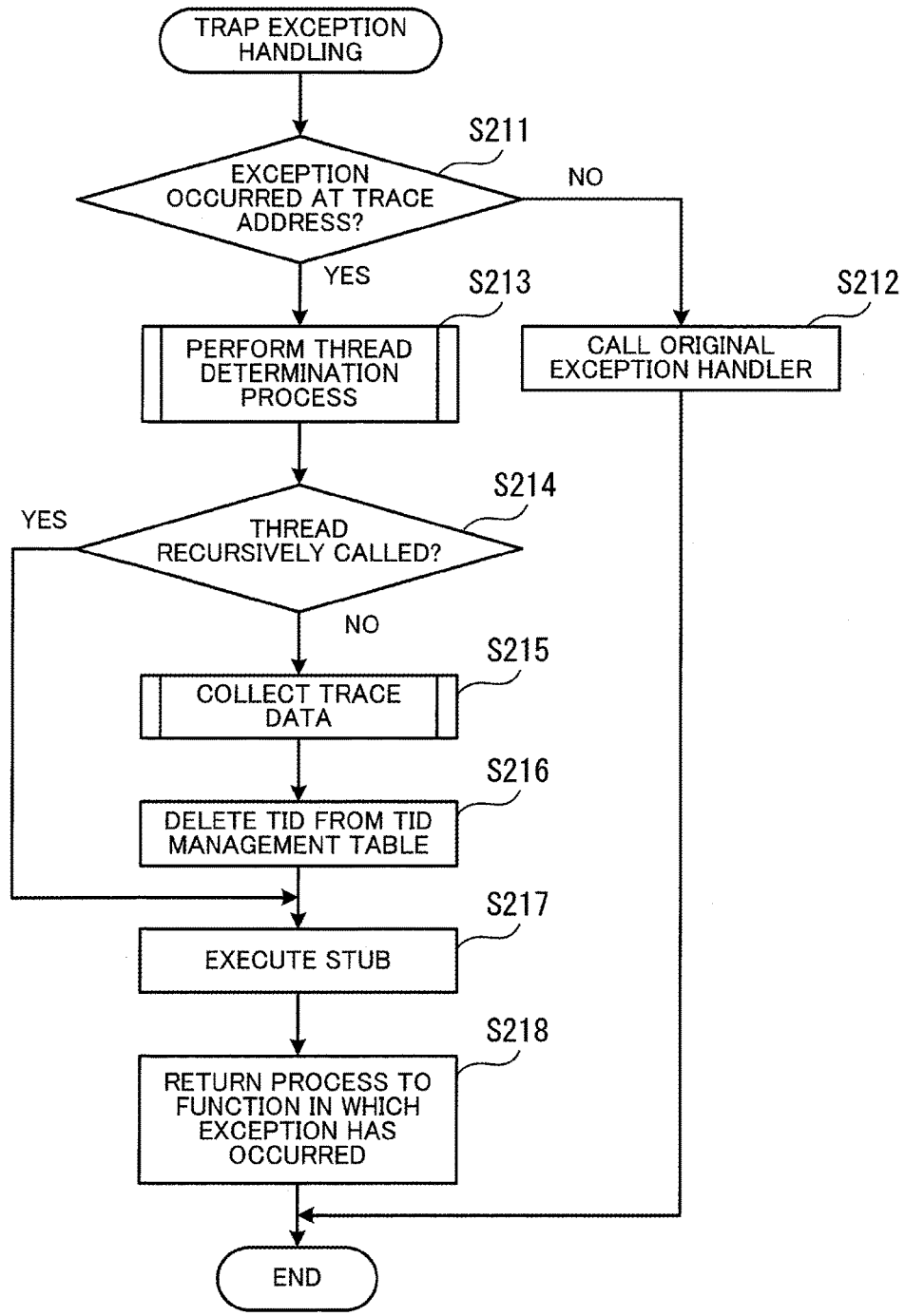
FIG. 21 is a flow chart of an example of a procedure for trap exception handling in the third embodiment.

FIG. 21 is a flow chart of an example of a procedure for trap exception handling in the third embodiment.

(Step S211) The driver unit 130 determines whether or not the exception has occurred at a trace address. If the exception has occurred at the trace address, then the driver unit 130 proceeds to step S213. If the exception has occurred at an address other than the trace address, then the driver unit 130 proceeds to step S212.

(Step S212) If the exception has occurred at an address other than the trace address, then the driver unit 130 calls an exception handler before the replacement in step S202 (see FIG. 20). The called exception handler is executed and exception handling not involving a trace process is performed. After that, the trap exception handling ends.

(Step S213) The driver unit 130 performs a thread determination process. In the thread determination process the driver unit 130 determines whether or not a thread in which the exception has occurred is recursively called by the execution of the handler 131c. The details of the thread determination process will be described later (see FIG. 23).

The driver unit 130 builds a TID management table in the course of the thread determination process. A TID management table is a data table used for managing TID for a thread in which an exception occurs.

FIG. 22 indicates an example of a TID management table. In the example of FIG. 22, a TID management table 63 includes Trace Address and TID columns. A trace address is set in the Trace Address column. TID for one or more threads in which an exception occurs at a corresponding trace address is set in the TID column. For example, there is a case where an API, which is a trace object, is individually called in different threads. In such a case, plural TIDs are associated with one trace address.

But to return, FIG. 21 will be described.

(Step S214) The driver unit 130 determines whether or not the determination that the thread is recursively called is made in step S213. If the determination that the thread is recursively called is made, then the driver unit 130 proceeds to step S217. If the determination that the thread is not recursively called is made, then the driver unit 130 proceeds to step S215.

(Step S215) If the thread is not recursively called, then the driver unit 130 performs a trace data collection process. The details of the trace data collection process will be described later (see FIG. 24).

(Step S216) The driver unit 130 deletes TID of the thread in which the exception has occurred and in which a function, which is a trace object, is performed from a list of TID in the TID management table associated with the trace address at which the exception has occurred.

(Step S217) The driver unit 130 executes a stub corresponding to the function which is a trace object.

(Step S218) The driver unit 130 returns the process to the function in which the exception has occurred. As a result, instructions are executed from an instruction at an address next to the address at which the exception has occurred in the thread in which the function in which the exception has occurred is performed.

The thread determination process will now be described in detail.

Figure 23:
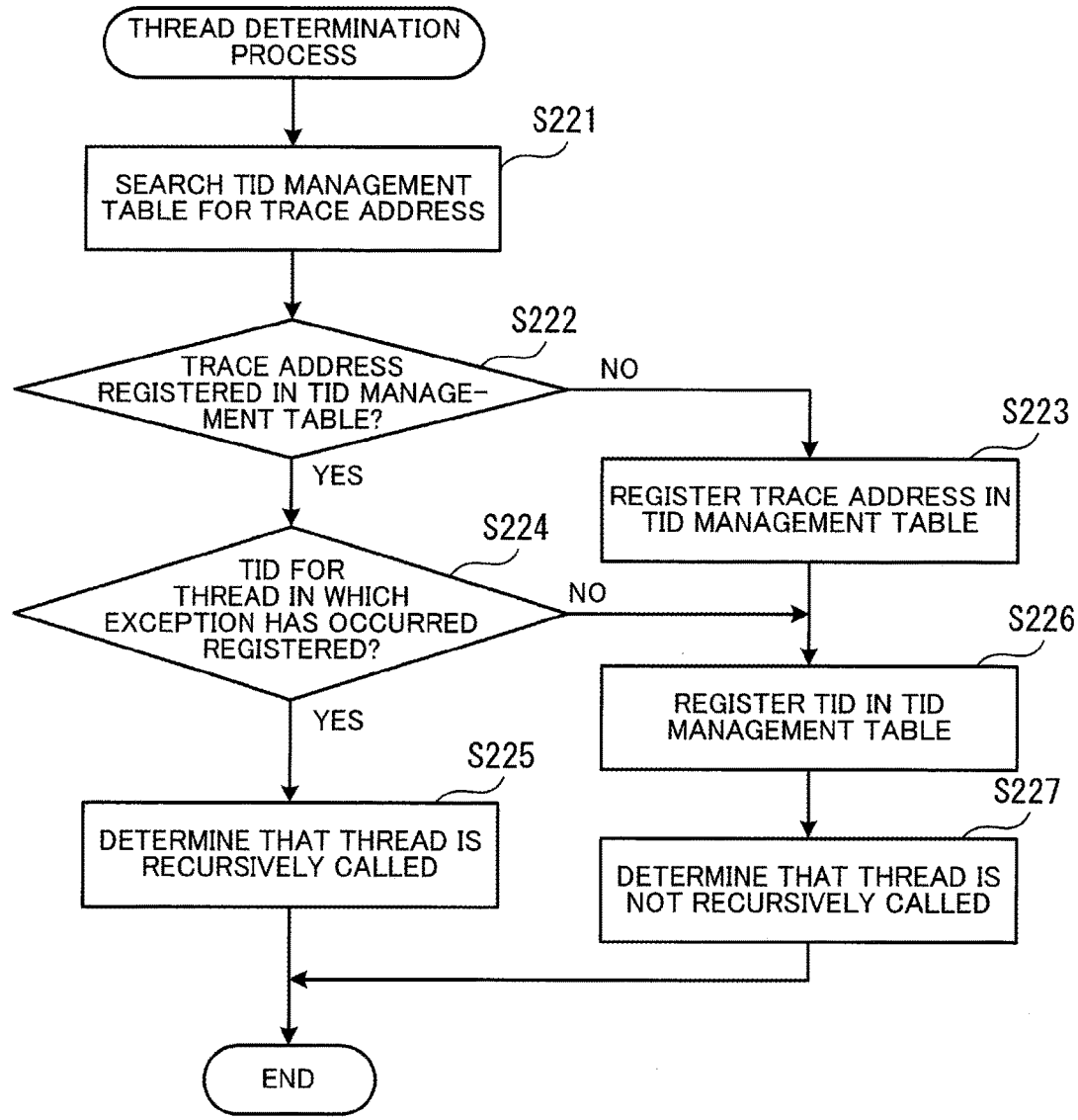
FIG. 23 is a flow chart of an example of a procedure for a thread determination process.

FIG. 23 is a flow chart of an example of a procedure for the thread determination process.

(Step S221) The driver unit 130 searches the TID management table 63 for a trace address at which an exception has occurred.

(Step S222) The driver unit 130 determines whether or not the trace address at which the exception has occurred is registered in the TID management table 63. If the trace address at which the exception has occurred is registered in the TID management table 63, then the driver unit 130 proceeds to step S224. If the trace address at which the exception has occurred is not registered in the TID management table 63, then the driver unit 130 proceeds to step S223.

(Step S223) The driver unit 130 registers in the TID management table 63 the trace address at which the exception has occurred. After that, the driver unit 130 proceeds to step S226.

(Step S224) The driver unit 130 determines whether or not TID for a thread in which this exception has occurred is registered in the TID management table 63 with the TID for the thread associated with the trace address at which the exception has occurred. If the TID for the thread in which this exception has occurred is registered in the TID management table 63, then the driver unit 130 proceeds to step S225. If the TID for the thread in which this exception has occurred is not registered in the TID management table 63, then the driver unit 130 proceeds to step S226.

(Step S225) If the TID for the thread in which the exception has occurred is registered in the TID management table 63 with the TID for the thread associated with the trace address at which the exception has occurred, then the driver unit 130 determines that the thread in which the exception has occurred is recursively called. After that, the thread determination process ends.

(Step S226) If the TID for the thread in which the exception has occurred is not registered in the TID management table 63 with the TID for the thread associated with the trace address at which the exception has occurred, then the driver unit 130 registers the TID for the thread in which the exception has occurred in the TID management table 63 with the TID for the thread associated with the trace address at which the exception has occurred.

(Step S227) The driver unit 130 determines that the thread in which the exception has occurred is not recursively called. After that, the thread determination process ends.

A procedure for the trace data collection process in the third embodiment will now be described.

Figure 24:
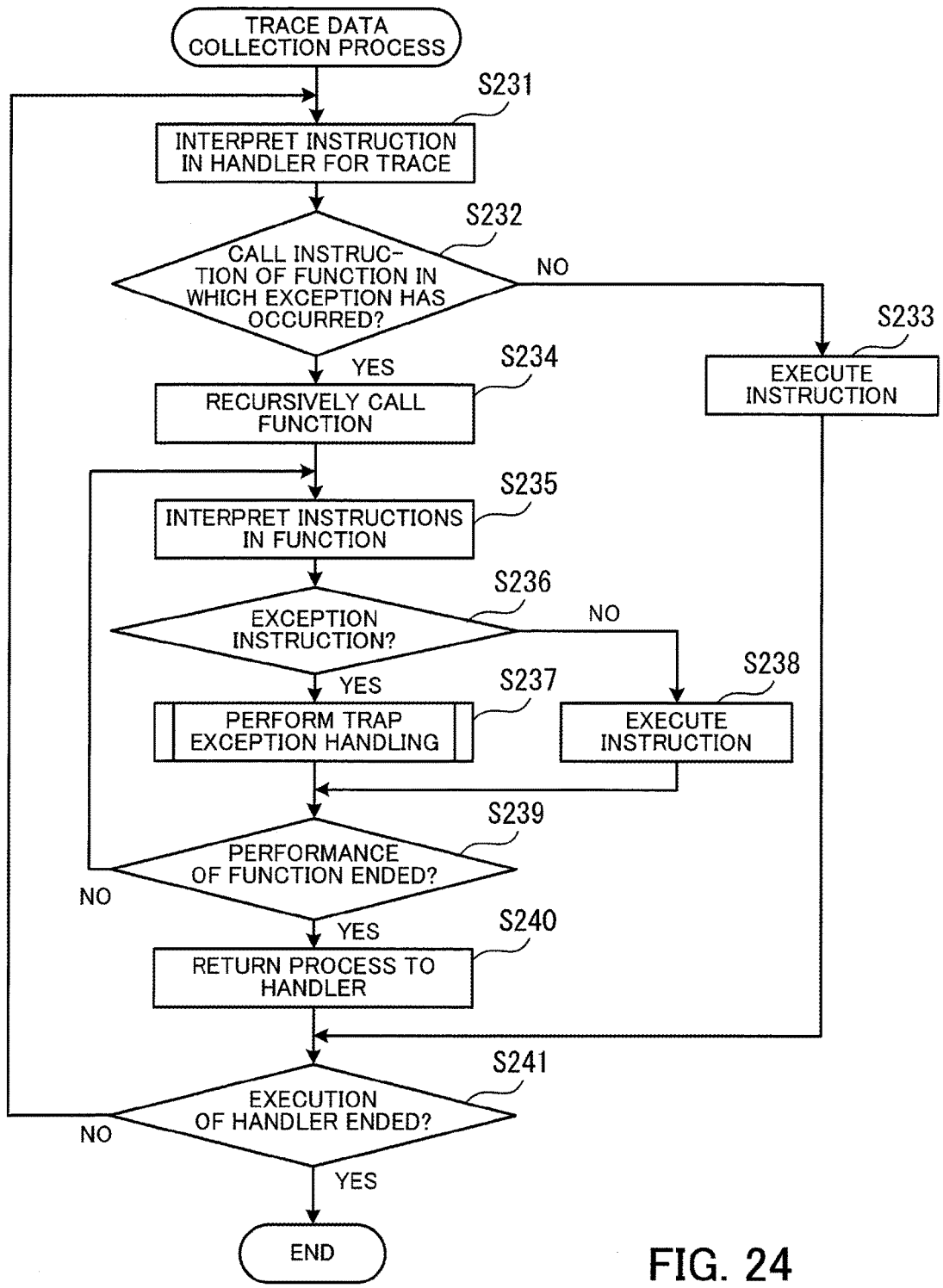
FIG. 24 is a flow chart of an example of a procedure for a trace data collection process in the third embodiment.

FIG. 24 is a flow chart of an example of a procedure for the trace data collection process in the third embodiment.

(Step S231) The driver unit 130 calls the handler 131c and interprets an instruction to be executed next in the handler 131c.

(Step S232) The driver unit 130 determines whether or not the instruction to be executed next in the handler 131c is a call instruction of a function (API) in which an exception has occurred. If the instruction to be executed next in the handler 131c is a call instruction of the function (API) in which the exception has occurred, then the driver unit 130 proceeds to step S234. If the instruction to be executed next in the handler 131c is not a call instruction of the function (API) in which the exception has occurred, then the driver unit 130 proceeds to step S233.

(Step S233) If the instruction to be executed next in the handler 131c is not a call instruction of the function in which the exception has occurred, then the driver unit 130 executes it. After that, the driver unit 130 proceeds to step S241.

(Step S234) If the instruction to be executed next in the handler 131c is a call instruction of the function in which the exception has occurred, then the driver unit 130 recursively calls the function in which the exception has occurred in accordance with the call instruction.

(Step S235) The driver unit 130 interprets instructions in the called function in order from the head.

(Step S236) The driver unit 130 determines whether or not an instruction to be executed next in the function in which the exception has occurred is an exception instruction. If the instruction to be executed next in the function in which the exception has occurred is an exception instruction, then the driver unit 130 proceeds to step S237. If the instruction to be executed next in the function in which the exception has occurred is not an exception instruction, then the driver unit 130 proceeds to step S238.

(Step S237) If the instruction to be executed next in the function in which the exception has occurred is an exception instruction, then the driver unit 130 makes an exception occur. As a result, the trap exception handling indicated in FIG. 21 is performed. After that, the driver unit 130 proceeds to step S239.

(Step S238) If the instruction to be executed next in the function in which the exception has occurred is not an exception instruction, then the driver unit 130 executes it.

(Step S239) The driver unit 130 determines whether or not the performance of the function (API) in which the exception has occurred has ended. If the performance of the function (API) in which the exception has occurred has ended, then the driver unit 130 proceeds to step S240. If the performance of the function (API) in which the exception has occurred has not ended, then the driver unit 130 proceeds to step S235 and interprets an instruction to be executed next in the function in which the exception has occurred.

(Step S240) If the performance of the function in which the exception has occurred has ended, then the driver unit 130 returns the process to the handler 131c and executes an instruction next to the call instruction of the function in which the exception has occurred.

(Step S241) The driver unit 130 determines whether or not the execution of the handler 131c has ended. If there is an instruction which is not yet executed, then the driver unit 130 proceeds to step S231. If the execution of the handler 131c has ended, then the trace data collection process ends.

Even if a point other than the head in a function, such as an API, which is a trace object is designated as a trace point, a call instruction of the function which is a trace object can be included in this way in a handler in which a data trace process is described. Therefore, a highly flexible trace data collection process can be performed.

In the third embodiment a case where a point other than the head in a function which is a trace object is designated as a trace point is taken as an example. However, even if the head of a function which is a trace object is designated as a trace point, data trace can be performed under the same process.

Fourth Embodiment

A fourth embodiment will now be described. The fourth embodiment is realized by combining the second embodiment and the third embodiment. In the fourth embodiment trace points are set in plural functions included in a program, which is a trace object. If one trace point is set in each function, trace data collection processes are switched according to whether the head or another point in each function is set as a trace point. For example, if the head of a function which is a trace object is set as a trace point in the fourth embodiment, then trace data is collected by the process in the second embodiment indicated in FIG. 16. Furthermore, if a point other than the head in a function which is a trace object is set as a trace point in the fourth embodiment, then trace data is collected by the process in the third embodiment indicated in FIG. 24.

In the fourth embodiment whether the head or another point in a function which is a trace object is set as a trace point is managed by the use of a trace management table.

Figure 25:
FIG. 25 indicates an example of a trace management table in a fourth embodiment.

FIG. 25 indicates an example of a trace management table in the fourth embodiment. A trace management table 64 in the fourth embodiment includes Trace Address, Original Instruction, Stub Address, and Flag columns. The same kinds of information that is set in the Trace Address, Original Instruction, and Stub Address columns of the trace management table 60 in the second embodiment indicated in FIG. 10 is set in the Trace Address, Original Instruction, and Stub Address columns respectively.

A flag which indicates whether or not a trace point indicated by a trace address is the heading of a function which is a trace object is set in the Flag column. For example, if a trace point is the heading of a function which is a trace object, then "TRUE" is set in the Flag column. Furthermore, if a trace point is not the heading of a function which is a trace object, then "FALSE" is set in the Flag column.

A procedure for a trace setting process in the fourth embodiment is the same as that for the trace setting process in the second embodiment indicated in FIG. 9. However, a trace setting file read process in a trace management table building process differs from the trace setting file read process in the trace management table building process in the second embodiment. In addition, the IAT rewriting process (step S102) is applied only to a case where a trace point is the heading of a function (API) which is a trace object. In the fourth embodiment a trace point may be designated by a symbol name and an offset. This is the same with the trace setting file 32a in the third embodiment indicated in FIG. 19.

Figure 26:
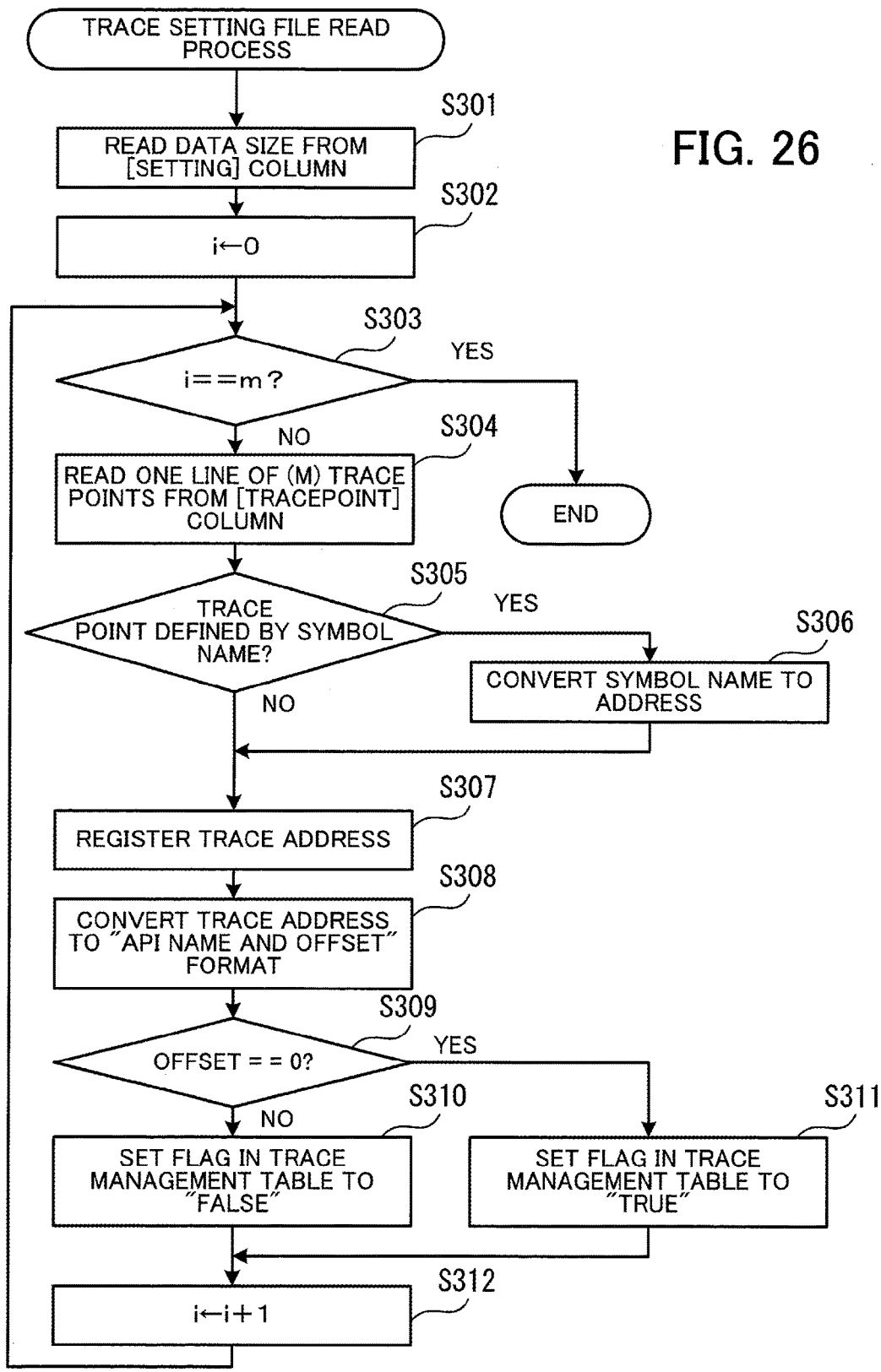
FIG. 26 is a flow chart of an example of a procedure for a trace setting file read process in the fourth embodiment.

FIG. 26 is a flow chart of an example of a procedure for the trace setting file read process in the fourth embodiment. Steps S301 through S307 and S312, of the steps indicated in FIG. 26, are the same as steps S121 through S128, respectively, indicated in FIG. 12. The steps (steps S308 through S311) which differ from the trace setting file read process in the second embodiment will now be described.

(Step S308) The driver unit 130 converts the trace address registered in the trace management table 64 to the "API name and offset" format. "API name" is, for example, a symbol name indicative of a function which is a trace object. The conversion from the trace address to "API name and offset" is made by the use of, for example, an API prepared by the OS.

(Step S309) The driver unit 130 determines whether or not the offset is 0. For example, if a trace point is the heading of the function which is a trace object, then the offset is 0. If the offset is 0, then the driver unit 130 proceeds to step S311. If the offset is not 0, then the driver unit 130 proceeds to step S310.

(Step S310) If the offset is not 0, then the driver unit 130 sets to "FALSE" a flag in the trace management table 64 corresponding to the trace point read in step S304. That is to say, that the trace point is not the heading of the function which is a trace object is set as the flag. After that, the driver unit 130 proceeds to step S312.

(Step S311) If the offset is 0, then the driver unit 130 sets to "TRUE" the flag in the trace management table 64 corresponding to the trace point read in step S304. That is to say, that the trace point is the heading of the function which is a trace object is set as the flag. After that, the driver unit 130 proceeds to step S312.

The trace management table 64 including a flag which indicates whether or not a trace point is the heading of a function is built in this way. When a trap exception occurs, whether or not a trace point is the heading of a function is determined on the basis of the trace management table 64. Trace data is then collected through a procedure corresponding to a determination result. Trap exception handling in the fourth embodiment will now be described in detail.

Figure 27:
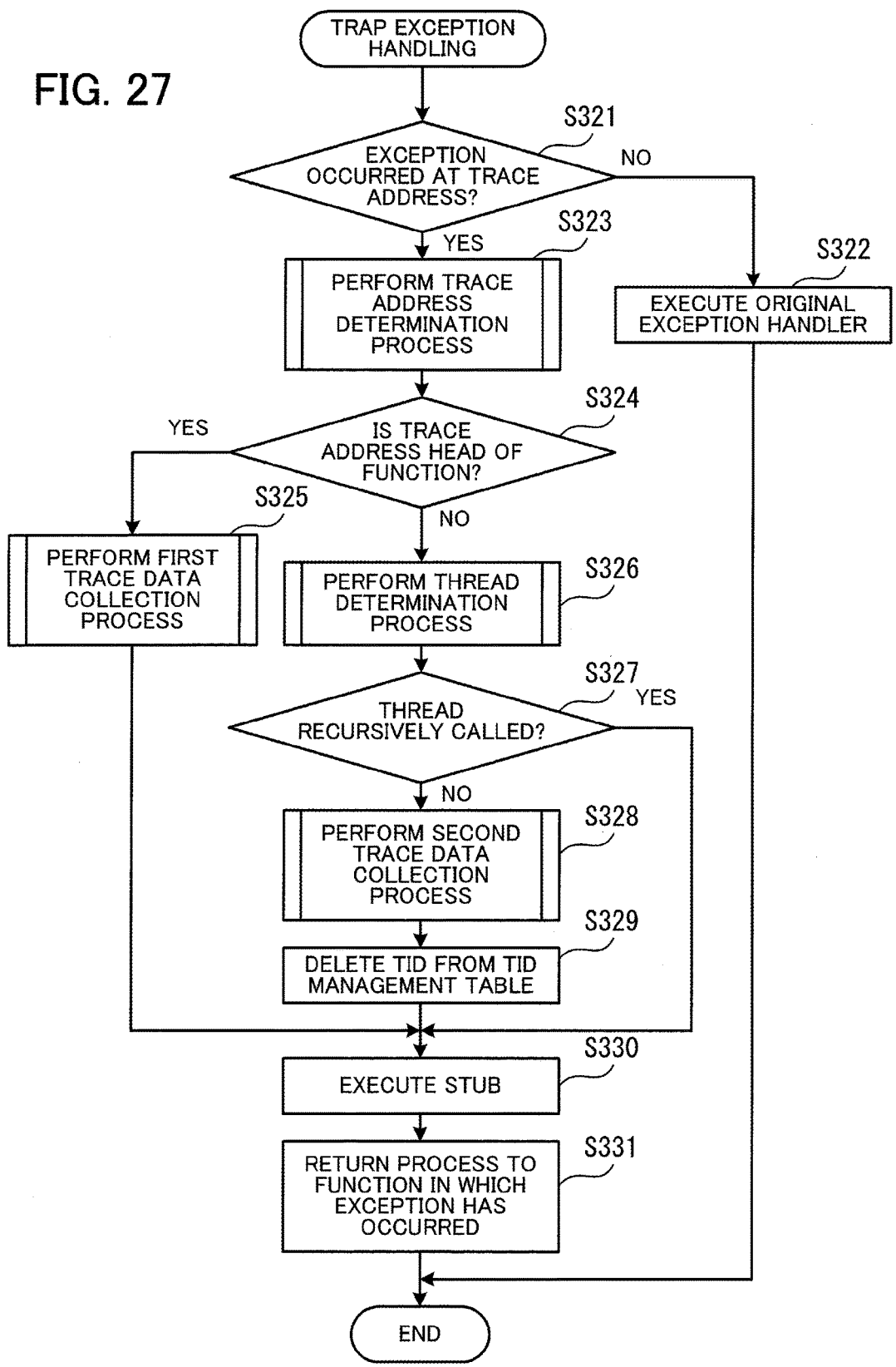
FIG. 27 is a flow chart of an example of a procedure for trap exception handling.

FIG. 27 is a flow chart of an example of a procedure for the trap exception handling. Steps S321, S322, and S326 through S331, of the steps indicated in FIG. 27, are the same as steps S211 through S218, respectively, indicated in FIG. 21. The steps (steps S323 through S325), of the steps indicated in FIG. 27, which differ from the trap exception handling in the second or third embodiment will now be described.

(Step S323) The driver unit 130 performs a trace address determination process. In the trace address determination process whether or not the trace address at which the exception has occurred is the head of a function that is a trace object. The details of the trace address determination process will be described later (see FIG. 28).

(Step S324) The driver unit 130 determines whether or not the trace address is the head of the function which is a trace object. If the trace address is the head of the function which is a trace object, then the driver unit 130 proceeds to step S325. If the trace address is not the head of the function which is a trace object, then the driver unit 130 proceeds to step S326 and collects trace data through a procedure which is the same as that described in the third embodiment.

(Step S325) The driver unit 130 collects trace data through a procedure which is the same as that described in the second embodiment. This trace data collection process is the same as the trace data collection process indicated in FIG. 16. After that, the driver unit 130 proceeds to step S330.

The trace address determination process will now be described in detail.

Figure 28:
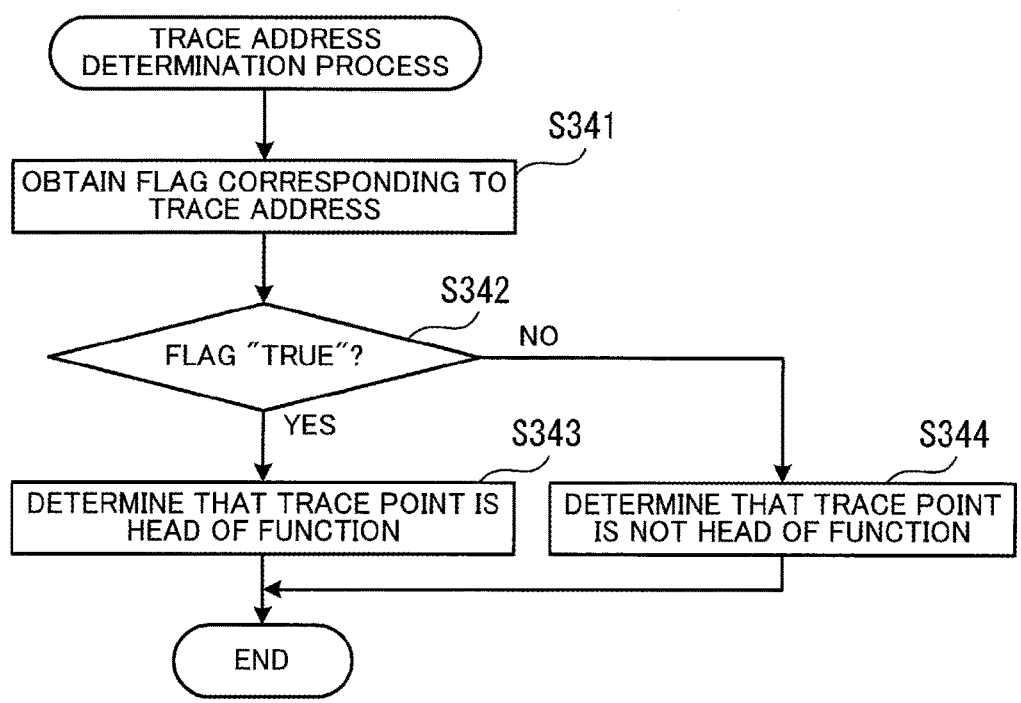
FIG. 28 is a flow chart of an example of a procedure for a trace address determination process.

FIG. 28 is a flow chart of an example of a procedure for the trace address determination process.

(Step S341) The driver unit 130 obtains from the trace management table 64 a flag corresponding to a trace address at which exception handling that is currently being performed has occurred.

(Step S342) The driver unit 130 determines whether or not the obtained flag is "TRUE". If the obtained flag is "TRUE", then the driver unit 130 proceeds to step S343. If the obtained flag is "FALSE", then the driver unit 130 proceeds to step S344.

(Step S343) If the obtained flag is "TRUE", then the driver unit 130 determines that a trace point is the head of a function which is a trace object, and terminates the trace address determination process.

(Step S344) If the obtained flag is "FALSE", then the driver unit 130 determines that a trace point is not the head of a function which is a trace object, and terminates the trace address determination process.

A technique for collecting data is changed in this way according to whether a trace point is the head of a function which is a trace object. If the trace point is the head of the function which is a trace object, there is no need to manage TID of a thread. As a result, data is collected by performing a simple process, and a load is light. Therefore, in the fourth embodiment data is collected even if a trace point is not the head of a function. In addition, data is traced under a light processing load, compared with the third embodiment.

The embodiments have been described in the foregoing. However, a component indicated in each embodiment may be replaced with another unit having the same function. Furthermore, any other component or process may be added. In addition, the structure (characteristics) of any two or more of the above embodiments may be combined.

According to an aspect, a process does not enter a loop even if a trace process is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable, non-transitory storage medium storing a processing program that causes a computer to perform a trace process on the basis of a trace code during execution of a program, the trace process comprising:
    rewriting a first instruction described at a trace point in a function defined in the program to a second instruction which gives instructions to execute the trace code and storing the first instruction in a storage unit;
    executing the trace code on the basis of the second instruction at the time of execution at the trace point in the function; and
    replacing, at the time of executing a third instruction which calls the function and which is included in the trace code, the second instruction at the trace point in the function with the first instruction stored in the storage unit and performing the function, wherein the trace process further includes, at the time of the trace point being a head of the function:
    continuously storing, at the time of storing the first instruction, in the storage unit the first instruction and a fourth instruction which gives instructions to execute a jump to an instruction next to the trace point in the function; and
    executing, at the time of executing the third instruction during execution of the trace code, in order the first instruction and the fourth instruction stored in the storage unit.

2. The computer-readable, non-transitory storage medium according to claim 1, wherein the trace process further includes changing, at the time of the trace point being the head of the function and at the time of storing the first instruction, information indicative of an address of a function which is a call destination of the third instruction to an address of the first instruction.

3. The computer-readable, non-transitory storage medium according to claim 1, wherein the trace process further includes:
    continuously storing, at the time of storing the first instruction, in the storage unit the first instruction and a fourth instruction which gives instructions to execute a jump to an instruction next to the trace point in the function; and
    beginning to perform, at the time of executing the third instruction during execution of the trace code, the function from a head on the basis of the third instruction and executing, at the time of an execution point in the function reaching the trace point, in order the first instruction and the fourth instruction stored in the storage unit.

4. The computer-readable, non-transitory storage medium according to claim 3, wherein the trace process further includes:
    storing, at the time of the execution point in the function reaching the trace point and at the time of beginning to execute the trace code, in the storage unit identification information for a process unit in which the program is executed; and
    executing, at the time of the execution point in the function reaching the trace point and at the time of the identification information for the process unit in which the program is executed being already saved, in order the first instruction and the fourth instruction stored in the storage unit instead of executing the trace code.

5. The computer-readable, non-transitory storage medium according to claim 1, wherein the trace process further includes:
    continuously storing, at the time of storing the first instruction, in the storage unit the first instruction and a fourth instruction which gives instructions to execute a jump to an instruction next to the trace point in the function;
    determining, at the time of beginning to execute the trace code, whether or not the trace point is a head of the function;
    executing, at the time of the trace point being the head of the function and at the time of executing the third instruction during execution of the trace code, in order the first instruction and the fourth instruction stored in the storage unit; and
    beginning to perform, at the time of the trace point not being the head of the function and at the time of executing the third instruction during execution of the trace code, the function from the head on the basis of the third instruction and executing, at the time of an execution point in the function reaching the trace point, in order the first instruction and the fourth instruction stored in the storage unit.

6. A trace method for performing a trace process on the basis of a trace code during execution of a program, the method comprising:
    rewriting, by a processor, a first instruction described at a trace point in a function defined in the program to a second instruction which gives instructions to execute the trace code and storing, by the processor, the first instruction in a storage unit;
    executing, by the processor, the trace code on the basis of the second instruction at the time of execution at the trace point in the function; and
    replacing, by the processor, at the time of executing a third instruction which calls the function and which is included in the trace code, the second instruction at the trace point in the function with the first instruction stored in the storage unit and performing, by the processor, the function, wherein the trace process further includes, at the time of the trace point being a head of the function:

continuously storing, at the time of storing the first instruction, in the storage unit the first instruction and a fourth instruction which gives instructions to execute a jump to an instruction next to the trace point in the function; and executing, at the time of executing the third instruction during execution of the trace code, in order the first instruction and the fourth instruction stored in the storage unit.

7. An information processing apparatus which performs a trace process on the basis of a trace code during execution of a program, the information processing apparatus comprising:

a processor configured to execute a process comprising:

rewriting a first instruction described at a trace point in a function defined in the program to a second instruction which gives instructions to execute the trace code and storing the first instruction in a storage unit;

executing the trace code on the basis of the second instruction at the time of execution at the trace point in the function; and replacing, at the time of executing a third instruction which calls the function and which is included in the trace code, the second instruction at the trace point in the function with the first instruction stored in the storage unit and performing the function, wherein the trace process further includes, at the time of the trace point being a head of the function:

continuously storing, at the time of storing the first instruction, in the storage unit the first instruction and a fourth instruction which gives instructions to execute a jump to an instruction next to the trace point in the function; and executing, at the time of executing the third instruction during execution of the trace code, in order the first instruction and the fourth instruction stored in the storage unit.

* * * * *